US011106725B1

(12) United States Patent
Fogg

(10) Patent No.: US 11,106,725 B1
(45) Date of Patent: Aug. 31, 2021

(54) SYSTEM AND METHOD FOR SEARCHING, WRITING, EDITING, AND PUBLISHING WAVEFORM SHAPE INFORMATION

(71) Applicant: Harold T Fogg, Aurora, CO (US)

(72) Inventor: Harold T Fogg, Aurora, CO (US)

(*) Notice: Subject to any disclaimer, the term of this patent is extended or adjusted under 35 U.S.C. 154(b) by 253 days.

(21) Appl. No.: 16/164,371

(22) Filed: Oct. 18, 2018

Related U.S. Application Data

(62) Division of application No. 14/708,226, filed on May 9, 2015, now Pat. No. 10,140,316.

(51) Int. Cl.
| | |
|---|---|
| *G06F 16/583* | (2019.01) |
| *G06F 16/2457* | (2019.01) |
| *G06F 16/51* | (2019.01) |
| *G06F 16/9535* | (2019.01) |
| *G06F 11/32* | (2006.01) |

(52) U.S. Cl.
CPC .... *G06F 16/5854* (2019.01); *G06F 16/24573* (2019.01); *G06F 16/51* (2019.01); *G06F 16/9535* (2019.01); *G06F 11/322* (2013.01)

(58) Field of Classification Search
CPC .................................................. G06F 16/5854
See application file for complete search history.

(56) References Cited

U.S. PATENT DOCUMENTS

| | | | | |
|---|---|---|---|---|
| 5,528,356 A | * | 6/1996 | Harcourt | G01M 11/3136 356/73.1 |
| 6,038,578 A | * | 3/2000 | Fogg | G06F 1/0321 708/270 |

* cited by examiner

*Primary Examiner* — Apu M Mofiz
*Assistant Examiner* — Sheryl L Holland
(74) *Attorney, Agent, or Firm* — Shifrin Patent Law; Dan Shifrin

(57) ABSTRACT

A system and method are provide for searching, writing, editing, and publishing waveform shape information. A publishing module publishes a sequence of distinct shape code values in which each shape code value has the number of members, and the sum of the member values is the same for each shape code value.

6 Claims, 18 Drawing Sheets

SYSTEM AND METHOD FOR SEARCHING, WRITING, EDITING, AND PUBLISHING WAVEFORM SHAPE INFORMATION

RELATED APPLICATION DATA

The present application is a divisional application of, and claims the benefit of, commonly-owned U.S. Pat. No. 10,140,316, entitled SYSTEM AND METHOD FOR SEARCHING, WRITING, EDITING, AND PUBLISHING WAVEFORM SHAPE INFORMATION, issued on Nov. 27, 2018, which patent is incorporated herein by reference in its entirety.

The present application is related to commonly-owned and co-pending U.S. application Ser. Nos. 16/164,321, 16/164,334, 16/164,350, 16/164,359, and 16/164,388, all entitled SYSTEM AND METHOD FOR SEARCHING, WRITING, EDITING, AND PUBLISHING WAVEFORM SHAPE INFORMATION, and all filed on the filing date hereof, which applications are incorporated herein by reference in their entireties.

The present application is also related to commonly-owned U.S. Pat. No. 9,489,345, entitled SYSTEM AND METHOD FOR PROVIDING PRODUCTS AND LOCATIONS, and U.S. Pat. No. 6,038,578, entitled METHOD AND SYSTEM FOR GENERATING A SERIES OF WAVEFORM DEFINITIONS, which patents are incorporated by reference in their entireties.

TECHNICAL FIELD

The present invention pertains generally to the generation of waveforms and, in particular, to a system and method for generating waveform information defined by a set of parameters.

BACKGROUND ART

When signals are received, transmitted, or processed, they are often represented as electromagnetic waveforms. Many products are available for processing such signals, and it is common practice to transform between domains of frequency and time, or frequency and space, to achieve desired results. In particular, an electrocardiograph monitors electrical signals produced by a beating heart. Other products monitor light waves transmitted in an optical fiber and others monitor the power transmitted in a wire.

Monitors may also compare the received waveform signals with defined waveforms and produce a desired result when an abnormal waveform is detected. For example, an implanted cardiac pacer may produce a stimulating pulse when it detects a heart arrhythmia.

It will be appreciated that a waveform signal monitor that does not function properly may cause serious consequences. Therefore, a variety of signal generator products such as arbitrary waveform generators and simulators have been developed to test waveform signal monitors by generating waveform signals that simulate real-world signals that are expected to be monitored.

A typical waveform signal generator may contain several digitized waveforms in non-volatile memory. Upon a request, a digitized waveform is recalled from memory and processed through a digital/analog convertor. The resulting analog waveform signal then is sent to the monitor that is being tested. The monitor's response to a known waveform or series of waveforms can then be observed.

The specific waveforms will vary according to the anticipated use of the waveform generator or simulator. For example, a simulator for use with a cardiac pacer or electrocardiograph may contain an R-wave and several common arrhythmia waveforms. A simulator for use with an optical fiber transmission monitor may contain backscatter waveforms associated with several common imperfections in the fiber.

Modern Signal Generators typically contain a variety of waveform shapes and have access to many more from remote sources. Regardless of the method by which digitized waveforms are provided, there remains the problem of finding, defining, or otherwise creating shapes for the waveforms to be provided. However, it seems that there is no systemized method by which new, uncommon, or previously non-existent waveforms are organized and published for waveform signal generators.

SUMMARY OF THE INVENTION

A system and method are provided for searching, writing, editing, and publishing waveform shape information in the form of books and waveform data files. A waveform shape may be defined from customer-input parameters. A family of shapes may also be defined that are related by one or more parameter values that change in a predetermined fashion. Once defined, the shape or shapes may be edited and published, such as to a data file. A customer may also perform a search for waveform shapes that have certain characteristics based on one or more input parameter values.

Customers and other users may find several features particularly useful in helping them turn an idea or sketch of a waveform shape into a large collection where similar but different shapes are illustrated in locations identified by Book, Page, Row, and Column. For example, a user may have a general idea for a waveform shape, or almost any other shape, represented by a rough preliminary drawing or, perhaps, a few typed characters. Using embodiments of the present invention, the user can get an entire book of shapes from almost any string of characters or from a few selected points representing their graphical sketch.

As an example, the process may begin with an entry of a search term such as "kuak" from which a search module displays several illustrations of shapes interpreted from the search term. If any of the shapes seem interesting, with just a few clicks the user can use the data term as a seed for growing a book of many shapes.

More specifically, but without in any way limiting the scope of the claims, the search term "kuak" may be interpreted as four equally spaced points on an x-y graph, each point having an amplitude identified by the four letters that represent decimal numbers "1020010," where k=10, u=20, and a=0. Similarly, twenty-six decimal integers from 0 to 25 are represented by letters "a to z," and for many sketches this is enough. Twenty-six more integers may be obtained by using upper case letters "A to Z". As a result, decimal integers from 0 to 51 can be represented by single character alphabetic letters.

Representing decimal integers with single characters is a useful concept for human users for a variety of reasons. For example, it simplifies the process of representing a sequence of points having variable distances between them. Consider a transition from the codes "kuak" to "k2u5a3k" or "k20u50a30k" or "k200u500a300k" as a convenient way to convert the sketchy idea of "kuak" to a more application-refined shape having 4 significant points called break points with a distance of 200 units from first to second, 500 to the next, and 300 to the next, for a total distance of 1000 units from the first point to the fourth point. These codes are called xyValues where yValues are represented by the alphabetic characters and xValues are represented by the decimal numbers. Consequently, a shape may be illustrated by plotting the break points defined by the xyValues and connecting from one break point to the next using a path defined by an interpolation method represented by an iValue.

Using an illustrated shape value as a seed, a sequence of shapes for a book may be built by defining a mixed base that specifies the number of states for each member of the shape code. For example, if x and i are held constant and the number of states is set to 6 for each member of the yCode, the yBase is [6666] which produces 6×6×6×6=1296 shapes which can be arranged in a variety of ways ranging from 1296 pages of 1 row and 1 column each to 1 page of any combination in which Rows x Columns=1296.

To limit the number of shapes to be represented in books of shapes, the number of states assigned to a given parameter can be reduced to provide any desired number of shapes. For example, a yValue having 10 break points with 4 breaks assigned 10 states and 6 breaks assigned 1 state, the total number of shapes would be 10×10×10×10=10,000, which maps conveniently to 100 pages of 10 rows and 10 columns each.

Using embodiments of the system and methods of the present invention, a large number of shapes similar to one of interest may be quickly produced for users to review and benefit.

In one embodiment, a system is provided for generating a shape data file from an entered search term, comprising: a processor and a memory configured to store instructions executable by the processor. The memory comprises: a shape value generation module for generating one or more shape values and a data file generation module, comprising instructions for converting the one or more shape values into a wave shape data file format exportable to the customer. The system further comprises a network input/output interface coupled to the processor and the memory through which the customer accesses the shape generation module.

In another embodiment, a method is provided for representing a relationship between a shape attribute instance and a related location attribute instance, comprising: providing a first shape code comprising at least one character in each of at least one corresponding position; providing a shape attribute instance, the at least one position in the shape code including at least a first position representative of the first shape attribute instance; providing a location attribute instance; designating a predetermined character representing the location attribute instance; and inserting into the first position the predetermined character, the predetermined character representing a relationship between the first shape attribute instance and the location attribute instance.

In a third embodiment, a system is provided for generating wave shapes from entered parameters, comprising: a processor and a memory configured to store instructions executable by the processor. The memory comprises: a shape writer module comprising instructions for receiving one or more shape values entered by a customer; and a data file generation module comprising instructions for converting the one or more shape values into a wave shape data file format exportable to the customer. The system further comprises a network input/output interface coupled to the processor and the memory through which the customer accesses the shape writer module.

In a fourth embodiment, a system is provided for generating wave shapes from entered parameters, comprising: a processor and a memory configured to store instructions executable by the processor. The memory comprises: a wave editor module comprising instructions for displaying a selected wave shape, receiving parameters entered by a customer, and editing the wave shape in accordance with the entered parameters; and a data file generation module comprising instructions for converting the edited wave shape into a wave shape data file format exportable to the customer. The system further comprises a network input/output interface coupled to the processor and the memory through which the customer accesses the shape editor module.

In a fifth embodiment, a system is provided for generating wave shapes from entered parameters, comprising: a processor and a memory configured to store instructions executable by the processor. The memory comprises: a wave page module comprising instructions for displaying a page of generated wave shapes, each wave shape being defined by a location in a book of wave shapes; and a data file generation module comprising instructions for converting the one or more wave shapes into a wave shape data file format exportable to the customer. The system further comprises a network input/output interface coupled to the processor and the memory through which the customer accesses the wave page module.

In a sixth embodiment, a system is provided for generating a shape data file from a search term, the system comprising: a processor and a memory to store instructions executable by the processor. The memory comprises: a shape value generation module for receiving a search term and converting the search term into a shape value; and a data file generation module for converting the shape value into a shape data file.

In a seventh embodiment, a system is provided for providing a shape data file from a search term, the system comprising: an interpreter for providing a shape value from a received search term; a value V1 and a value V2; and a data file generator to provide the shape data file from the shape value, the number of samples, a number of bits, the value V1 and a value V2.

In an eighth embodiment, a system is provided for providing a shape illustration from a received data term, the system comprising: a shape writer module for interpreting a shape value from a received data term and generating a shape illustration from the shape value.

In a ninth embodiment, a system is provided for illustrating a relationship between a shape code member and a location code member, the system comprising: a shape code comprising a shape code member; a location code representing the shape code and comprising a location code member; and a generator for replacing the shape code member with a predetermined character identifying the location code member.

In a tenth embodiment, a system is provided for providing a shape data file from a shape sketch, the system comprising: a processor programmed with instructions for identifying a shape value from a shape sketch; and a data file generation module for providing a shape data file from the shape value.

In a eleventh embodiment, a system is provided for providing a book of shape illustrations from a search term, the system comprising: an interpreter for providing a shape code from a search term; a provider for providing a shape code base defining a number of states for each member of the shape code base; and a sequence provider for providing a sequence of shape values from the shape code base, the maximum number of shape values being equal to the multiplicative product of the members of the shape code base.

In a twelfth embodiment, a system is provided for providing a sequence of shape values, the system comprising: a sequence provider for providing a sequence of differing digit arrays in which each digit array in the sequence has the same number of elements and the same sum of the elements; and a shape value provider for providing shape values having xValues, the xValues of each shape value being equal to one of the digit arrays generated from the sequence provider; whereby: all of the shape values have an equal number of break points; and each shape value has a different interval width between successive break points.

In a thirteenth embodiment, a system is provided for providing a sequence of shape values, the system comprising: a sequence provider for providing a sequence of differing digit arrays in which each digit array in the sequence has the same number of elements and the same average of values of the element; and a shape value provider for providing shape values having yValues, the yValues of each shape value being equal to one of the digit arrays generated from the sequence provider; whereby: all of the shape values have an equal number of break points; and each shape value has a different yValue.

DETAILED DESCRIPTION OF THE PREFERRED EMBODIMENT

Definitions

Figure 1A:
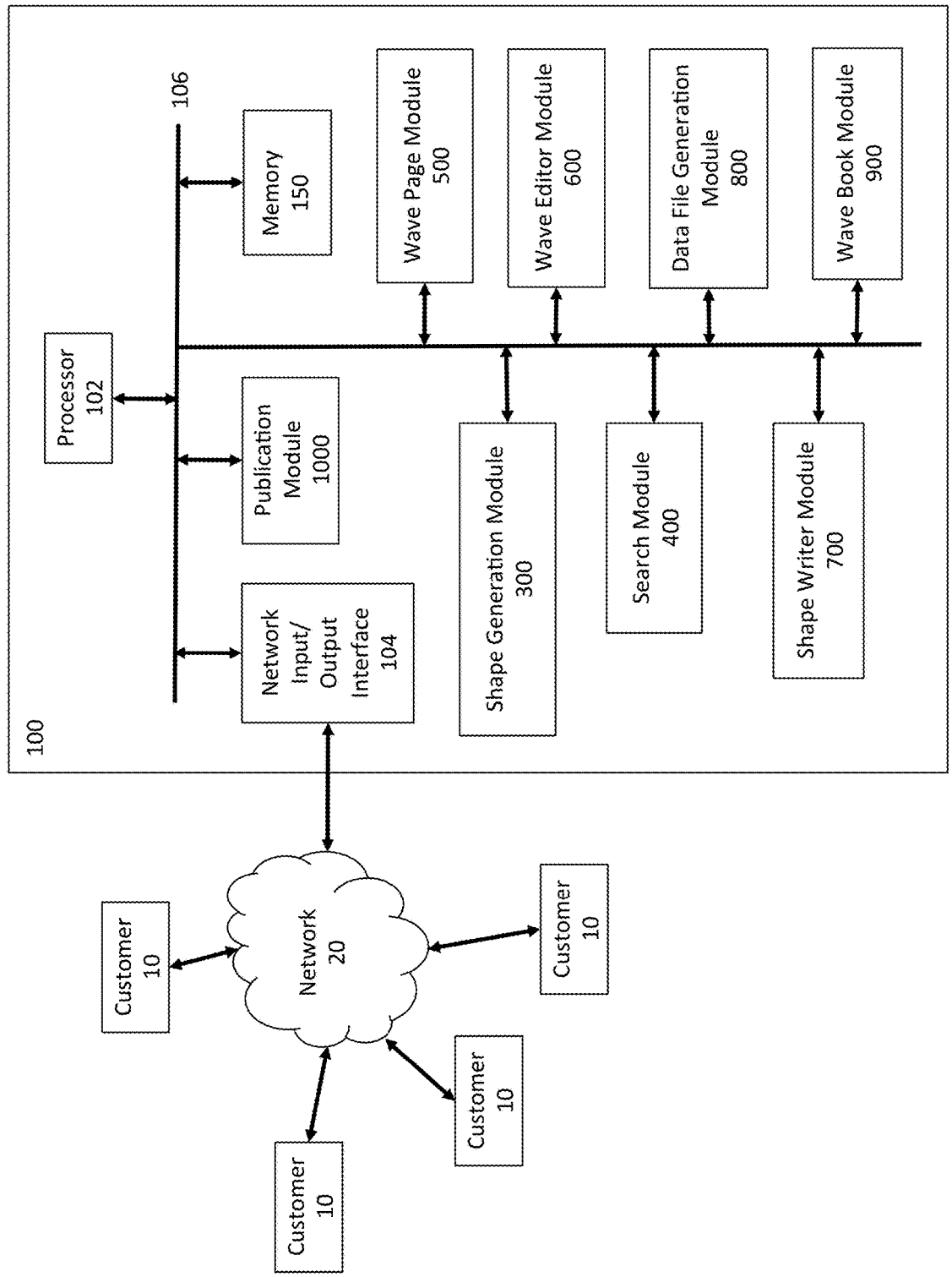
FIG. 1A is a block diagram of a system for the generation and purchase of waveform shape information.

To aid in understanding the present invention, the following list of terms and their meanings is included. The meaning of the terms, as set forth below, is the intended meaning whenever the term is used herein, unless another meaning is believed to be clear from the context.

Alpha Digit: Any one of the fifty-two upper and lower case letters in the English alphabet used to represent integers from zero through fifty-one where the lower case letters "a" through "z" represent zero through twenty-five and the upper case letters "A" through "Z" represent the numbers twenty-six through fifty-one. Used to represent digits in numbers having number bases up to fifty-two (see TABLE I, Digit, Negative Alpha Numeral).

TABLE I

Relations Between Alphabetic Symbols and Positive and Negative Decimal Numerals

| LOWER CASE | | UPPER CASE | | |
| --- | --- | --- | --- | --- |
| | | | Alternate | Alternate |
| Alpha Symbol | Positive Decimal | Alpha Symbol | Positive Decimal | Negative Decimal |
| a | 0 | A | 26 | 0 |
| b | 1 | B | 27 | −1 |
| c | 2 | C | 28 | −2 |
| d | 3 | D | 29 | −3 |
| e | 4 | E | 30 | −4 |
| f | 5 | F | 31 | −5 |
| g | 6 | G | 32 | −6 |
| h | 7 | H | 33 | −7 |
| i | 8 | I | 34 | −8 |
| j | 9 | J | 35 | −9 |
| k | 10 | K | 36 | −10 |
| l | 11 | L | 37 | −11 |
| m | 12 | M | 38 | −12 |
| n | 13 | N | 39 | −13 |
| o | 14 | O | 40 | −14 |
| p | 15 | P | 41 | −15 |
| q | 16 | Q | 42 | −16 |
| r | 17 | R | 43 | −17 |
| s | 18 | S | 44 | −18 |
| t | 19 | T | 45 | −19 |
| u | 20 | U | 46 | −20 |
| v | 21 | V | 47 | −21 |
| w | 22 | W | 48 | −22 |
| x | 23 | X | 49 | −23 |
| y | 24 | Y | 50 | −24 |
| z | 25 | Z | 51 | −25 |

Alpha Numeral: One or more alpha digits used in representing numbers having bases up to fifty-two (see Alpha Digit, Negative Alpha Numeral).

Attribute: A characteristic, property, specification, or component part of a product used by a product provider along with system provided information to provide a product.

Attribute Instance: A particular case of an attribute. For example, consider a shape defined in an x-y plane by a set of N points; each point is defined by an attribute instance of the attributes x and y, where x and y represent the coordinates of the points. There are N instances of each attribute represented by x(1:N) and y(1:N). The notation x(1:N) means the same as: x(1), x(2), . . . x(N). The notation (1:N) is read as "1 to N" and means 1, 2, . . . , N.

Base: (see Number Base).

Book: A group or collection of one or more pages that may include illustrations, words, symbols, and coded instructions. Used to represent a structure in which locations are identified by sub-structures represented by parameters such as page, row, and column.

Book Code: A code used to provide one or more books.

Catalog: A list or record of the contents of a book, a library or a group of libraries arranged according to a specified system.

Code: An array or subscripted variable that represents information used to identify and provide products. A product code has four types of related meanings; namely, code attribute, code base, code index, and code value.

Code Attribute: A code that represents attribute instances used to identify and provide products.

Code Base: A code that defines the number of states for each member of a code attribute. Each member of a code base is an integer greater than zero.

Code Index: An integer provided from a code base that provides a sequence of consecutive indexes from zero to a number one less than the base. Alternate meanings may be useful, such as specifying a minimum index other than zero to provide a maximum index equal to the minimum index plus the base minus one.

Specifying a minimum index other than zero is generally avoided herein because of the complications it causes, particularly in converting number representations in one number base to a different base.

Code Value: A number provided from an index by an index to value control function and which provides an index from a value to index control function. A code value is a number used most directly by a product provider to provide a product.

Control Function: Used for converting an Index to a Value, the inverse of which converts a Value to an Index. Typically, each Code member will have a separate control function for the conversion; thus, a Product code with six members will have six independent control functions. Often the control function are of the linear form Value=Slope*Index+First Value, and for Slope not equal to zero, the inverse control function is: Index=(Value−First Value)/Slope.

Decimal Digit: One of the ten characters 0, 1, 2, . . . , 9 used in representing decimal numbers and other numbers having a base less than ten.

Decimal Numeral: One or more decimal digits used to represent numbers in the decimal number system (see Alpha Numeral).

Digit: A symbol, generally a single character, used in representing numbers. In the decimal system, ten characters are used: 0, 1, 2, 3, 4, 5, 6, 7, 8, and 9. For number systems requiring more than ten unique digits, it is common to define more single character symbols. For number bases larger than about fifty, the advantage of single character symbols to represent digits is decreased by the difficulty of learning symbols not commonly associated with number representations. The decimal system is convenient for defining multi-symbol digits because it is so easy to determine the name and number represented by decimal numbers. For example, rather than define a single symbol for a digit that represents "one-hundred-seven", it is easier to define the decimal equivalent multi-character symbol "107", and use it as a digit in any number base greater than "one-hundred-seven" (see Alpha Digit, Decimal Digit).

FSy: Also yFS, an abbreviation for "full scale value of y."

Index: An integer provided from a number base. Unless otherwise specified herein, an index ranges from a minimum integer of zero to a maximum integer of base minus one.

iCode: A code used to provide an interpolation method. Abbreviation for Interpolation Code (see Interpolation, Interpolation Code).

Index Label: A label that identifies an index.

Interpolation: A process used to define, estimate or find intermediate values for terms between terms having known values. Also, used to define a path from one point to a next point (see iCode).

Interpolation Code: A code used to provide an interpolation method.

Interpolation is used for determining undefined points between points defined in a Shape Code. An iCode defines the interpolation method used to determine the path to be taken from a defined point to the next point, even when the next point is not yet defined. The interpolation method may vary between sequences of shapes, between shapes within a sequence, and between break points in the same shape (see iCode, Interpolation).

Library: A location or place containing books, products, recordings, computer software, or other items arranged and cataloged in a specified way.

Location: A special kind of product where a product is or could be located. Locations are commonly identified by coordinates representing places such as country, state, city, street, avenue, building, library, floor, cabinet, shelf, book, page, row, column, cell, etc. Locations may also be identified by position in computer memory devices.

Location Code: A code used to provide a location.

Mixed Base Number. A multi-position number where the number base of each position is independent of the base defined for other positions (see Number Base, Number Representation).

Negative Alpha Numeral: An alternate Alpha Numeral for representing negative numbers with upper case letters from the English alphabet. "A" through "Z" are used to represent zero through negative twenty-five. Helpful in avoiding minus signs in code values (see TABLE I and Alpha Numeral).

Number Base: The number of digits available for each position of a positional number system. Each digit represents a unique state. The Base for a position in a number is equal to the number of states for that position. TABLE II lists representations of some decimal numbers in other number bases. In a mixed base system, each position of the number has a number of digits independent of the number of digits in other positions (see Digit, Number Representation).

Number Name: The English language name of a number, such as one, two, ten, one hundred, etc. A number's name is independent of the representation of the number (see Number Representation).

TABLE 11

Representations of some Decimal Numbers in other Number Bases.

| Decimal Ten | Alphabetic Twenty Six | Binary Two | Octal Eight | Mix Base [2 1 3 3] |
|---|---|---|---|---|
| 0 | a | 0000 | 0 | 0000 |
| 1 | b | 0001 | 1 | 0001 |
| 2 | c | 0010 | 2 | 0002 |
| 3 | d | 0011 | 3 | 0010 |
| 4 | e | 0100 | 4 | 0011 |
| 5 | f | 0101 | 5 | 0012 |
| 6 | g | 0110 | 6 | 0020 |
| 7 | h | 0111 | 7 | 0021 |
| 8 | i | 1000 | 10 | 0022 |
| 9 | j | 1001 | 11 | 1000 |
| 10 | k | 1010 | 12 | 1001 |
| 11 | l | 1011 | 13 | 1002 |
| 12 | m | 1100 | 14 | 1010 |
| 13 | n | 1101 | 15 | 1011 |
| 14 | o | 1110 | 16 | 1012 |

TABLE 11-continued

Representations of some
Decimal Numbers in other Number Bases.

| Decimal Ten | Alphabetic Twenty Six | Binary Two | Octal Eight | Mix Base [2 1 3 3] |
|---|---|---|---|---|
| 15 | p | 1111 | 17 | 1020 |
| 16 | q | 10000 | 20 | 1021 |
| 17 | r | 10001 | 21 | 1022 |

Number Representation: One or more symbols or signals used to represent a number. The number "five" is represented by the decimal digit "5," by the alpha digit "f," and by the binary numeral "101." In positional number systems, numbers are represented by predefined digits and number bases. Some representations of the number fourteen are:
"14" in decimal from (1*10+4*1)
"1110" in binary from (1*8+1*4+1*2+0*1)
"E" in hexadecimal by digit definition.
"o" in Lower Case Alpha Digits by digit definition.
"24" in Base Five from (2*5+4*1).
"4002" in Mixed Base"5113" from (4*3+0*3+0*3+2*1) or by noticing that the number is the maximum for the Base and, thus, is one less than the maximum of fifteen (5*1*1*3) unique numbers for the Base.

Numeral: One or more symbols used to represent a number. The number four is represented by the binary numeral "100," the decimal digit "4," the alpha digit "e," and the Roman numeral "IV." A single symbol numeral, usually a digit, represents the number predefined for that symbol. A multi-symbol numeral represents a number defined by a predefined number base (mixed or conventional) and predefined digit symbols (see Number Representation).

Page Code: A code used to provide a page.

Product: An item that is received, produced or provided including articles of manufacture, items, shapes, books, waveforms, locations, locations for other products, etc.

Product File: A sequence of numbers used to produce products defined by the numbers.

Rows: Plural of row and also an abbreviation that means "number of rows." For example, the statement: Rows=11, means "the number of rows equals eleven."

Sequence: An ordered succession of one or more items that are identified by consecutive integers.

Shape: Something such as a mold or pattern used to give or determine form.

Shape Code: A code used to provide a shape.

Shape File: A sequence of numbers used to produce products having shapes defined by the numbers (see Product File).

Signal: Anything that conveys information.

Signal Generator. A product that generates signals according to control settings or commands. Examples include physiological signal simulators, arbitrary waveform generators (AWG), arbitrary function generators, arbitrary signal generators, and function generators.

Sketch: A preliminary draft prepared with the intention of showing some essential features without all the details, such as a rough figure or a few words or symbols.

Sub Code: Members of a code corresponding to a common attribute, such as xCode, yCode, zCode, iCode, Row Code, Column Code, Page Code, Book Code, etc.

Value Label: A label that identifies values.

Waveform: A graph or illustration obtained by plotting values of one quantity against another quantity, and sometimes refers to an electrical signal and may mean the same thing.

xCode: A code used to provide x-coordinates.

xLabel: A label used to identify parameters related to "x."

xyCode: A combination of an xCode and a yCode in a merged member format, i.e. "$x_1\ y_1\ x_2\ y_2\ \ldots\ x_N\ y_N$," where x and y are used to provide x-y coordinates.

xValue: xCode members representing value information for the x coordinate attribute of a shape.

yFormat: Defines location control parameters for each position of the yCode.

yCode: A code used to provide y-coordinates.

yIndex: A yCode member representing index information for the y coordinate attribute of a shape.

yLabel: A label used to identify parameters related to "y."

yValue: A yCode member representing value information for the y coordinate attribute of a shape.

zCode: A code used to provide z-coordinates.

zIndex: A zCode member representing index information for the z coordinate attribute of a shape.

zValue: A zCode member representing value information for the z coordinate attribute of a shape.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

The present invention provides a method and system for generating and providing wave shapes and books of wave shapes on a custom basis. A block diagram of such a system 100 is illustrated in FIG. 1A and includes a processor 102, a network input/output interface 104, a memory 150, a connecting bus 106, and may include one or more operational modules. It will be appreciated that the system 100 may include other components, such as input devices and a display. The network interface 104 permits the system 100 to be accessed remotely, such as through the internet 20, by customers 10 using computers. Preferably, the system 100 provides a secure login feature for the customers 10.

Stored in the memory 150 are instructions to be executed by the processor 102. The modules may be implemented in circuitry or as sets of instructions. The modules may include one or more of a search module 400, a shape generation module 300, a wave page module 500, a wave editor module 600, a shape writer module 700, a data file generation module 800, a wave book module 900, and a publication module 1000, among others, coupled to each other through the bus 106. The modules 300, 400, 500, 600, 700, 800, 900, 1000 may contain instructions that are called and executed by the processor 102 when a customer 10 logs in and uses different features of the system 100. The outputs of each of the search, edit, write, and publish modules 400, 600, 700, 1000, respectively, are interconnected with the inputs of each of the other module through the bus 106. Similarly, the inputs of each of the search, edit, write, and publish modules 400, 600, 700, 1000, respectively, are interconnected with the outputs of each of the other module through the bus 106. More specifically, the publication module 1000 may coordinate the output from any of the other modules and present it to the user 10 in a user-specified format. Further, while the system 100 may include fewer than all of the modules 300, 400, 500, 600, 700, 800, 900, 1000, and while any of the search, edit, write, and publish modules 400, 600, 700, 1000, respectively, may function independent of the others, the synergistic interaction among the those modules provides a more comprehensive and integrated system 100, illustrated graphically in FIG. 1B.

Figure 2:
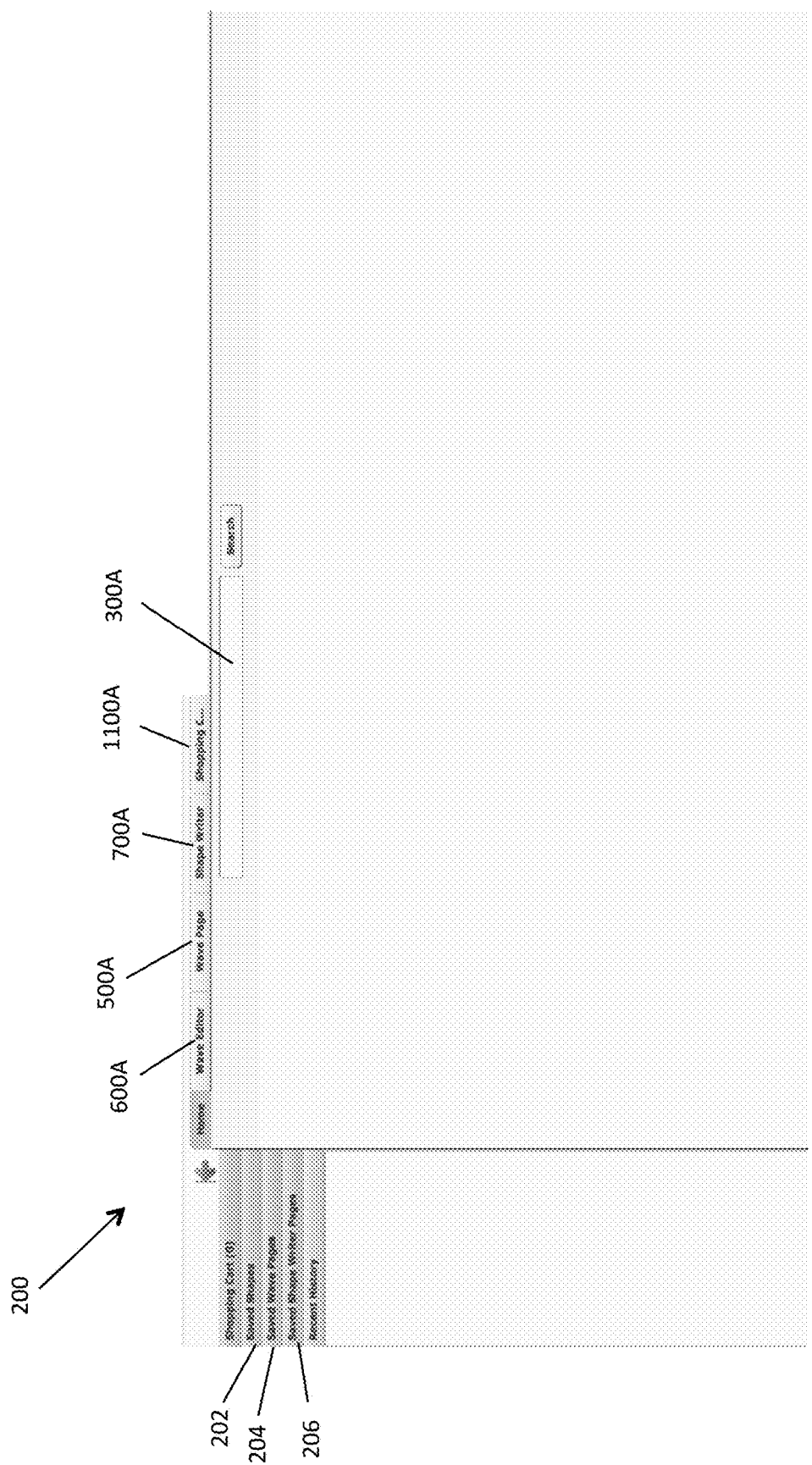
FIG. 2 is a screen shot of a search page of an internet web site providing wave shapes before search criteria have been entered.

When a customer 10 logs in to the system 100, a home page 200, such as illustrated in the screen shot of FIG. 2, is transmitted to the customer's computer. A number of available options are displayed to a customer 10. The customer may select from a number of side tabs and go directly to a page displaying the customer's saved shapes 202, a page displaying the customer's saved wave pages 204, or a page displaying the customer's saved shape writer pages 206. The customer may also select a tab 700A and go directly to the shape writer module 700 (FIG. 10) and define a shape, break point by break point. Alternatively, the customer may enter a search term or search parameters into an entry block 300A and, based on the entry, the search module 400 will generate a shape value. As will be described, a shape may be defined by a "shape value" which includes a set of break points, each consisting of three associated values: x and y coordinates with an interpolation method identified by an iValue. The customer may also select a tab 500A and go to the wave page module 500 or select a tab 600A and go to the wave editor module 600. The customer may also view any items selected for purchase by selecting a tab 1100A and go to a shopping cart.

Figure 3:
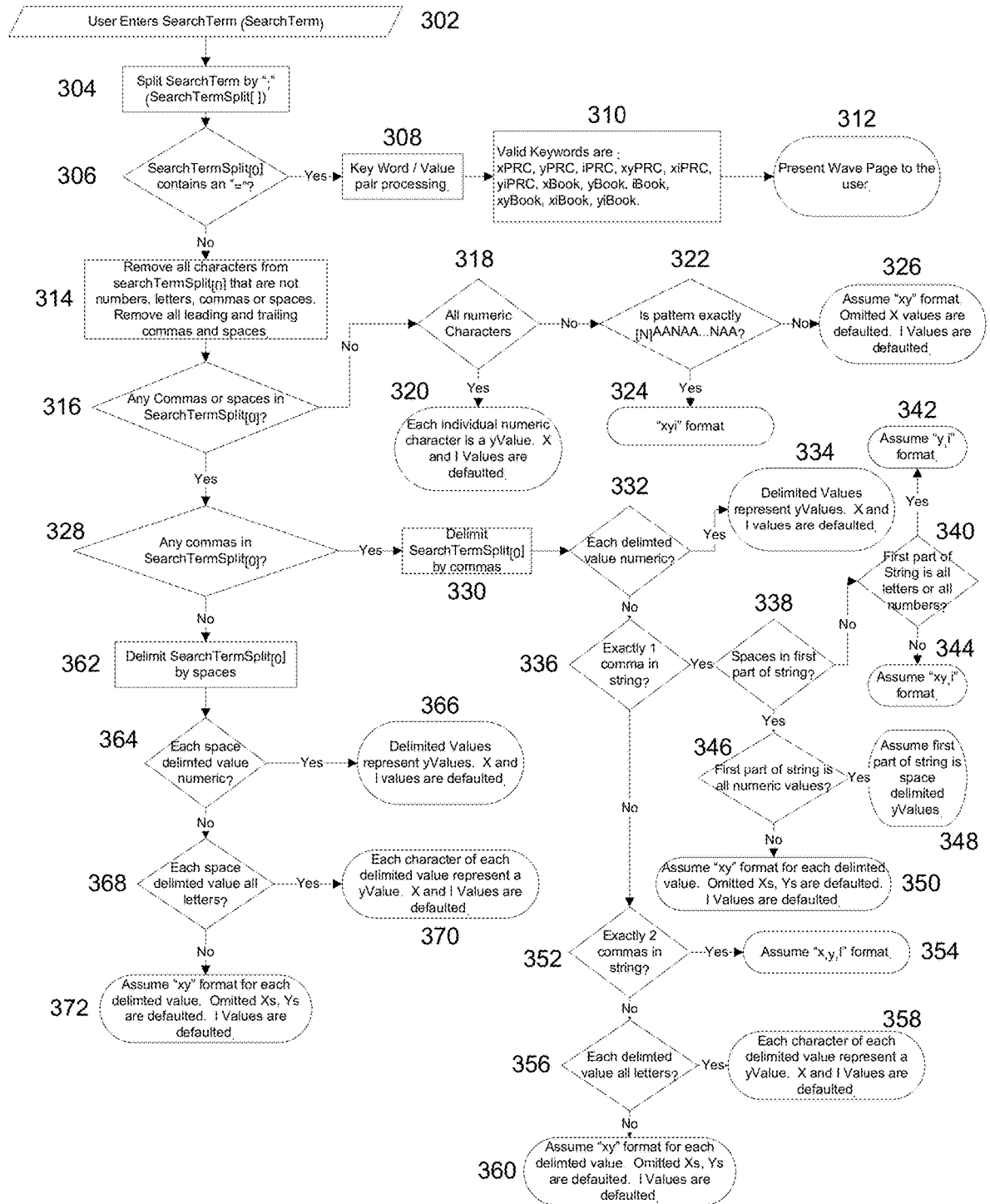
FIG. 3 is a flow chart of a process by which wave shapes are generated in the system of FIG. 1 based on an entered search term.

Referring to the flow chart of FIG. 3, the search term entered by the customer (step 302) may be processed by a search algorithm. If the search term is delimited by semicolons, the delimited parts may be processed as separate search terms (step 304). Thus, hereinafter the phrase "search term" will be used to refer to any search term, whether it is an originally-entered search term or is a delimited part of an originally-entered search term. If the search term contains an "=" (step 306), the term undergoes key word/value processing (step 308) to determine whether valid keywords are present (step 310). Such keywords may include "xPRC," "yPRC," "iPRC," "xyPRC," "xiPRC," "yiPRC," "xBook," "yBook," "iBook," "xyBook," "xiBook," and "yiBook." A wave page may then be presented to the customer and displayed (step 312).

If, on the other hand, the search term does not contain an "=" (step 306), the search term is parsed or processed by removing all characters that are not decimal numbers, letters, commas, or spaces although leading and trailing spaces may also be removed (step 314). The goal of the subsequent decisions is to determine the format of the search term so that an appropriate process may be applied to the search term to generate a representative wave shape. First, a determination is made as to whether there are any commas or any non-leading or non-trailing spaces in the parsed search term or string (step 316). If not, a determination is made as to whether the parsed search term or string contains only decimal numbers (step 318). If so, each individual decimal number is considered to be a yValue. The xValues and iValues are defaulted to predefined values (step 320). For example, an xValue may default to 1, or to the preceding xValue. Similarly, an iValue may default to a linear interpolation method or to the preceding iValue. Each set consisting of an xValue and an associated yValue represents the "x" and "y" coordinates of a breakpoint of a shape. An iValue is associated with an [xValue, yValue] set and represents an interpolation method by which a path is generated from one break point to the next of the wave shape.

Interpolation methods that may be selected by the customer may include one or more of the following methods:
0. a) "None": No interpolation between the first and next break point.
1. b) "Linear": Linear interpolation between the first and next break point.
2. c) "Step Function": Vertical line from the first breakpoint to the y coordinate of the next break point followed by a horizontal line to the next break point.
3. d) "Step Next Function": Horizontal line from the first breakpoint to the x coordinate of the next break point followed by a vertical line to the next break point.
4. e) "Sine 90Z": Interpolation path following 90 degrees of a sine wave with the first breakpoint at zero slope,
5. f) "Sine 90Z Next": Interpolation path following 90 degrees of a sine wave with the next breakpoint at zero slope.
6. g) "Sine 180Z": Interpolation path following 180 degrees of a sine wave with zero slope at both the first and next breakpoint.
7. h) "Sine Line Min": The sum of a linear line and sine wave. The amplitude of the added sine wave is one that provides a single point of zero slope on the line from the first breakpoint to the next.
8. i) "Sine line Max": The sum of a linear line and sine wave. The amplitude of the added sine wave is one which provides a minimum and maximum amplitude within the bounds of a rectangle defined by the first and next breakpoint.
9. j) "EZ": Interpolation path following one quarter of an ellipse with the first breakpoint at zero slope.
10. k) "EZ Next": Interpolation path following one quarter of an ellipse with the next breakpoint at zero slope.
11. l) "E180Z": Interpolation path following 2 quarters of an ellipse with the second quarter of the ellipse reflected across the y axis with both the first and next breakpoint at zero slope.
12. m) "E180I": Interpolation path following 2 quarters of an ellipse with the second quarter of the ellipse reflected across the x axis with both the first and next breakpoint at infinite slope.
27. B) "Rectangle": Two channel interpolation path with both the first and next breakpoint at vertices of a rectangle.
28. C) "Right Triangle": Two channel interpolation path with both the first and next breakpoint at acute vertices of a right triangle and the right angle vertex at the x coordinate of the first breakpoint and the y coordinate of the next breakpoint.
29. O) "Right Triangle Next": Two channel interpolation path with both the first and next breakpoint at acute vertices of a right triangle and the right angle vertex at the x coordinate of the next breakpoint and the y coordinate of the first breakpoint.
30. E) "Isosceles Triangle H": Two channel interpolation where the first breakpoint is one vertex of an isosceles triangle and one side of the isosceles triangle is a horizontal line from the first breakpoint to the x coordinate of the next breakpoint.
31. F) "Isosceles Triangle V": Two channel interpolation where the first breakpoint is one vertex of an isosceles triangle and one side of the isosceles triangle is a vertical line from the first breakpoint to the y coordinate of the next breakpoint.

32. G) "Ellipse": Two channel interpolation path where both the first and next breakpoint are vertices of a rectangle that bound a drawn ellipse.

If the string contains any character other than decimal numbers (step 318), a determination is made as to whether it presents a pattern that is exactly "[N] AANAA . . . NAA", where each "N" represents a decimal digit and each "A" represents an alpha character (step 322). If so, the string is considered to be in the format of "xyi" (step 324). Otherwise, it is assumed that the string has the format "xy" in which iValues and omitted xValues are defaulted (step 326).

Returning to the decision at step 316, if the string does contain commas or internal spaces, another decision is made as to whether it contains any commas (step 328). If so, the string is considered to be delimited by commas (step 330). If each delimited part or value is numeric (step 332), the delimited values represent yValues, and the xValues and iValues are defaulted (step 334). If not all delimited values are numeric (step 332), a determination is made as to whether there is one and only one comma in the delimited value (step 336). If so, a next determination is made as to whether there are spaces in the first part of the delimited value (step 338). If not, a determination is made as to whether the first part of the delimited value is all letters or numbers (step 340). If so, the format is considered to be "y,i" (step 342); otherwise, the format is assumed to be "xy,i" (step 344). If, at determination step 336, it is determined that there are spaces in the first part of the delimited value, a further determination is made as to whether the first part is all numeric values (step 346). If so, the first part is considered to comprise delimited yValues (step 348). Otherwise, the format is considered to be "xy" for each delimited value; iValues and omitted xValues and yValues are defaulted (step 350).

It will be appreciated that other characters or symbols may be used instead of the equals sign, commas, and spaces within a search term.

If, at step 336, it is determined that there is not one and only one comma (that is, that there is more than one comma) in the delimited value, a determination is made as to whether there are two commas (step 352); if so, the format is considered to be "x,y,i" (step 354). Otherwise, a further determination is made as to whether each delimited value contains all letters (step 356). If so, each character of each delimited value is considered to represent a yValue while xValues and iValues are defaulted (step 358). Otherwise, each delimited value is considered to be in an "xy" format, with iValues and omitted xValues and omitted yValues being defaulted (step 360).

Returning to the decision at step 328, if the search term does not contain any commas, the search term is deemed to be delimited by spaces (step 362) and determination is made as to whether each space-delimited value is numeric (step 364). If so, the delimited values represent yValues with xValues and iValues being defaulted (step 366). If each space-delimited value is not numeric, a further determination is made as to whether each is all alpha characters (step 368). If so, each character of each delimited value represents a yValue with the xValues and iValues being defaulted (step 370). Finally, if each space-delimited value is not all letters (step (368), it is considered that the search term has an "xy" format and iValues and omitted xValues and yValues are defaulted (step 372).

Figure 4:
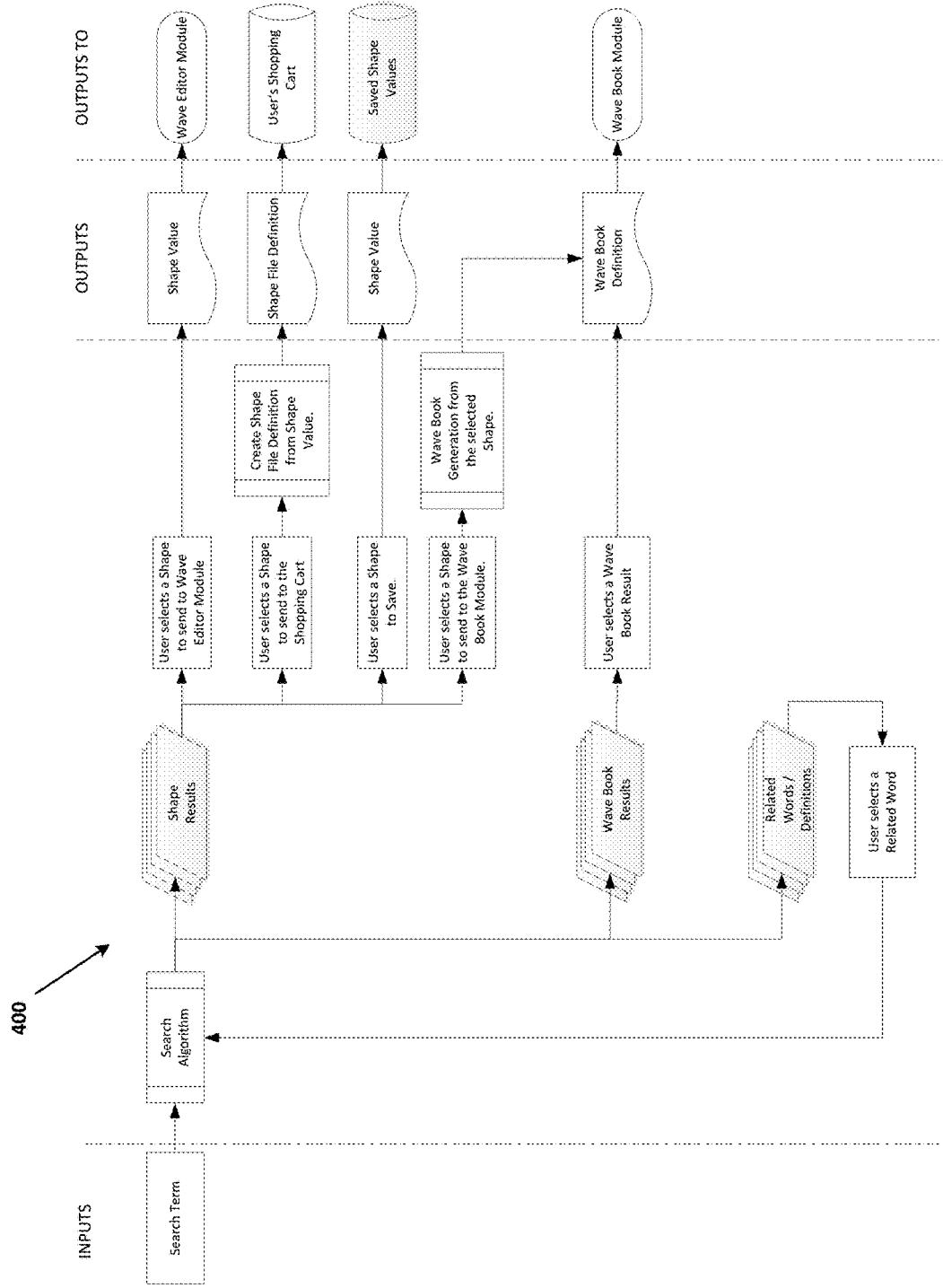
FIG. 4 is a functional block diagram of the search module in FIG. 1.

After the format of the search term has been determined, the shape generation module 300 generates shape values, each being a set of an xValue, a yValue, and an iValue and makes a representation of a shape from the shape value available to be displayed. FIG. 4 illustrates options that may be available to the user after the search term has been processed.

Figure 5A:
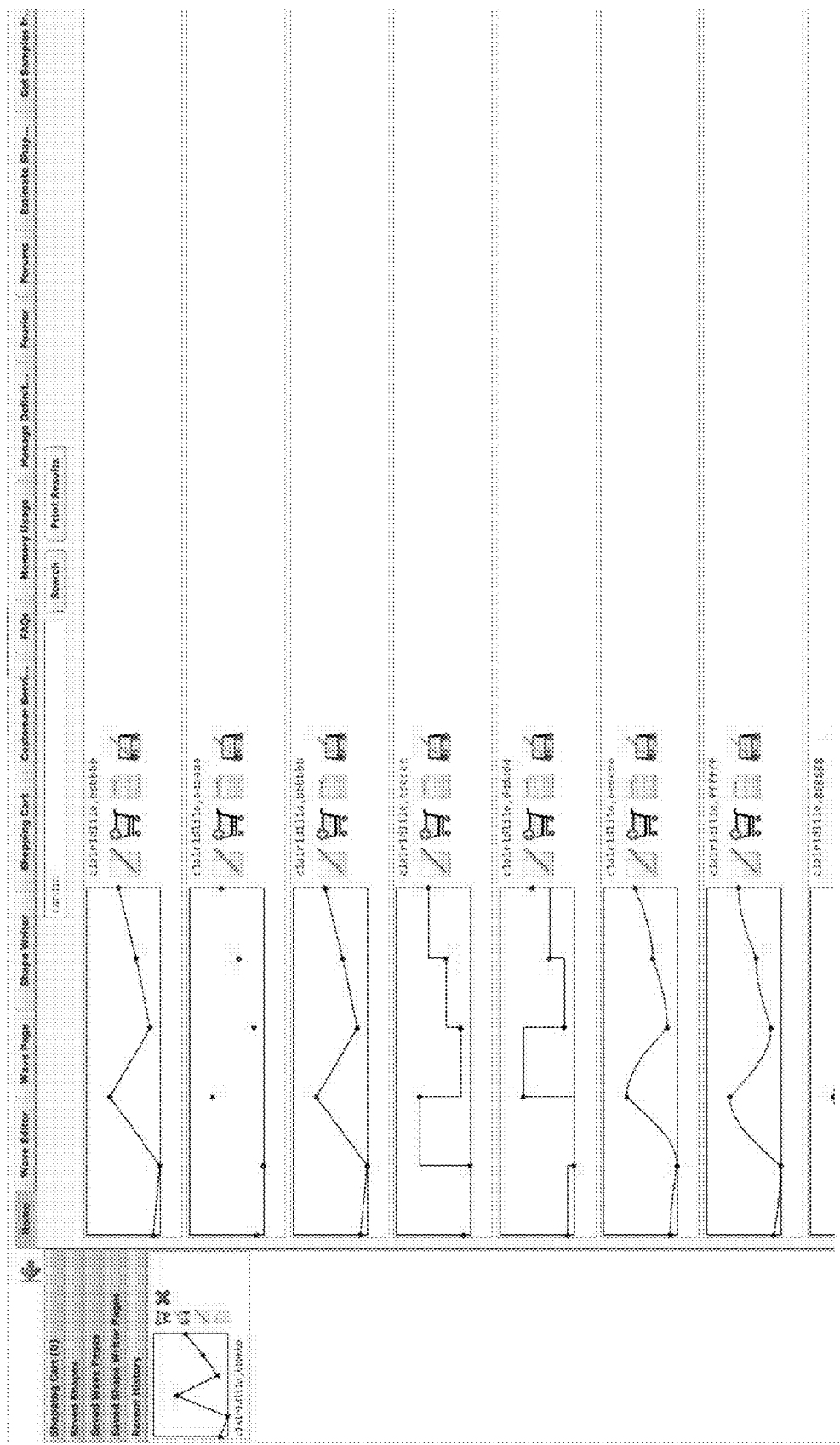
FIGS. 5A, 5B, 5C are screen shots of the search page of FIG. 2 showing wave shapes generated after search criteria have been entered.
Figure 5B:
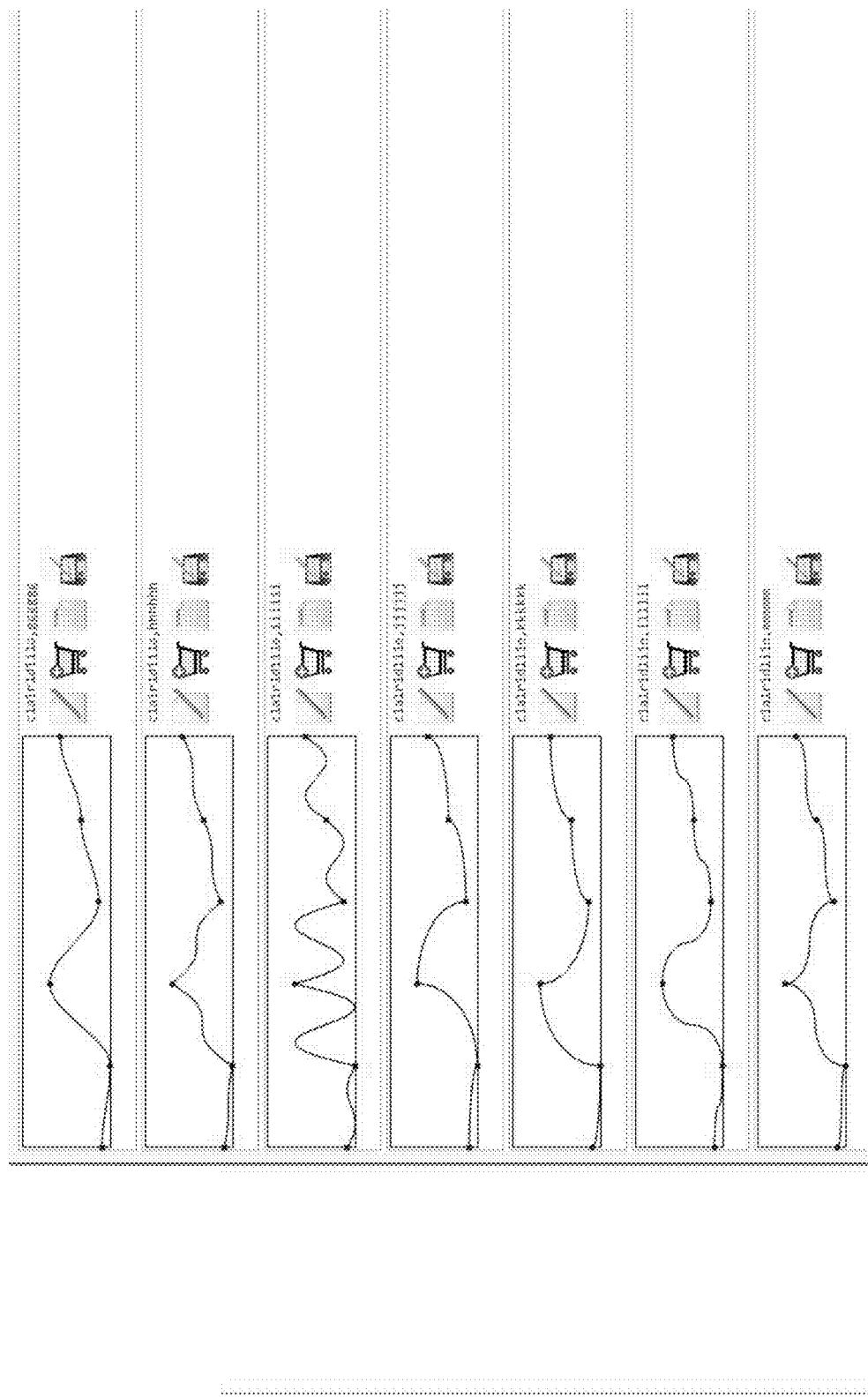
Figure 5C:
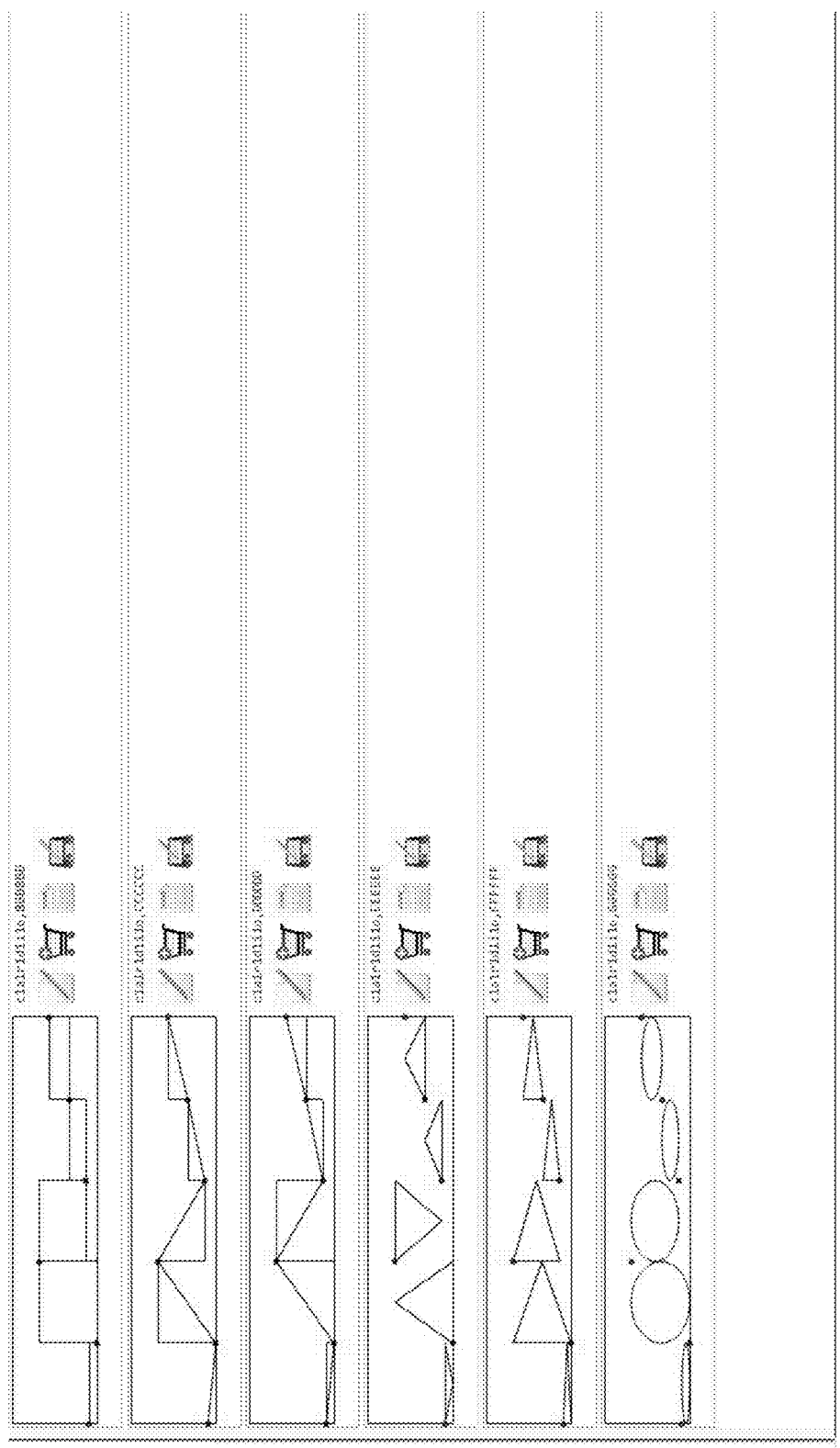

If the customer has entered a search term and an initial shape value has been generated, a representation of the initial shape value may be plotted and displayed on the search page along with variations in which one or more parameters in the initial shape value are changed (FIGS. 5A-5C, in which only the iValues are changed). In the example illustrated in the FIGS., the search parameter "cardio" was entered and used to provide the yValue for the shape value. The customer selects any one of the displayed shapes and may go to a page of shapes (FIG. 8A), go to a wave editor page (FIG. 7), or go to the wave book module 900. The customer may also choose to save the shape value for later reference or place the shape in a shopping cart for purchase.

It may be desirable that the xValues and yValues be integers and generating the minimum form of a set of xValues and yValues provides further benefits, such as convenient scaling. For example, where x=[0253], the width w=Sum(x)=10. When x is scaled by a factor of k for the interval between break points, xFile=k*x (where k equals an integer greater than 0). Thus, as shown in TABLE III:

wFile=Sum(xFile)=(0+2*k+5*k+3*k)=10*k

TABLE III

Scaling Factors

| k | xFile = k * x | | | | wFile = Sum(xFile) |
|---|---|---|---|---|---|
| 1 | 0 | 2 | 5 | 3 | 10 |
| 2 | 0 | 4 | 10 | 6 | 20 |
| 5 | 0 | 10 | 25 | 15 | 50 |
| 10 | 0 | 20 | 50 | 30 | 100 |
| 100 | 0 | 200 | 500 | 300 | 1000 |
| 1000 | 0 | 2000 | 5000 | 3000 | 10000 |

It is preferable to begin scaling of the sets of xValue and yValue from the minimum form; that is, where the xFile contains no common factors of the xValues (other than 1). Indications that a set is in the minimum form include the set containing a 1 or containing at least two different prime numbers. Where an xFile does contain a common factor, the values in the set may be converted to the minimum form by dividing each value by the common factor. This may be performed as many times as necessary until there is no common factor. For example:

TABLE IV

Example of Minimum Forms

| xValue | Any Common Factors (Other than 1) | Minimum Form |
|---|---|---|
| [0 2 5 3] | NO | [0 2 5 3] |
| [0 2 10 6] | YES | 1/2 × Value = [0 1 5 3] |
| [0 25 10 40] | YES | 1/5 × Value = [0 5 2 8] |
| [0 6 15 25] | NO | [0 6 15 25] |

To provide integer yFileValues, it is convenient to use the relation:

$YFileValue = c*yValue*2^{(Bits-m)}$ where c is an integer equal to V2/FSy and m is selected so that V2<$2^m$.

Selections of V2=1000, and m=10 work well for FSy equal to a factor of 1000 and for a number of bits from 8 to 16. For example, when yValue=FSy, Bits=10, and m=10, the relation provides yFileValue=V2*2^0=1000. For 8 bits, 12 bits, 14 bits and 16 bits, the yFileValues are 250, 4000, 16000, and 64,000. If V2=10^6 and m=20, the yFileValues for 16, 18, 20, and 22 bits are 62,500250,000, 1,000,000, 4,000,000. It should be understood that for this example, a value V1=0 is assumed and it doesn't appear in the yFileValue relation. If V1 is not zero, V2 is replaced in the relation by V2–V1.

Figure 6:
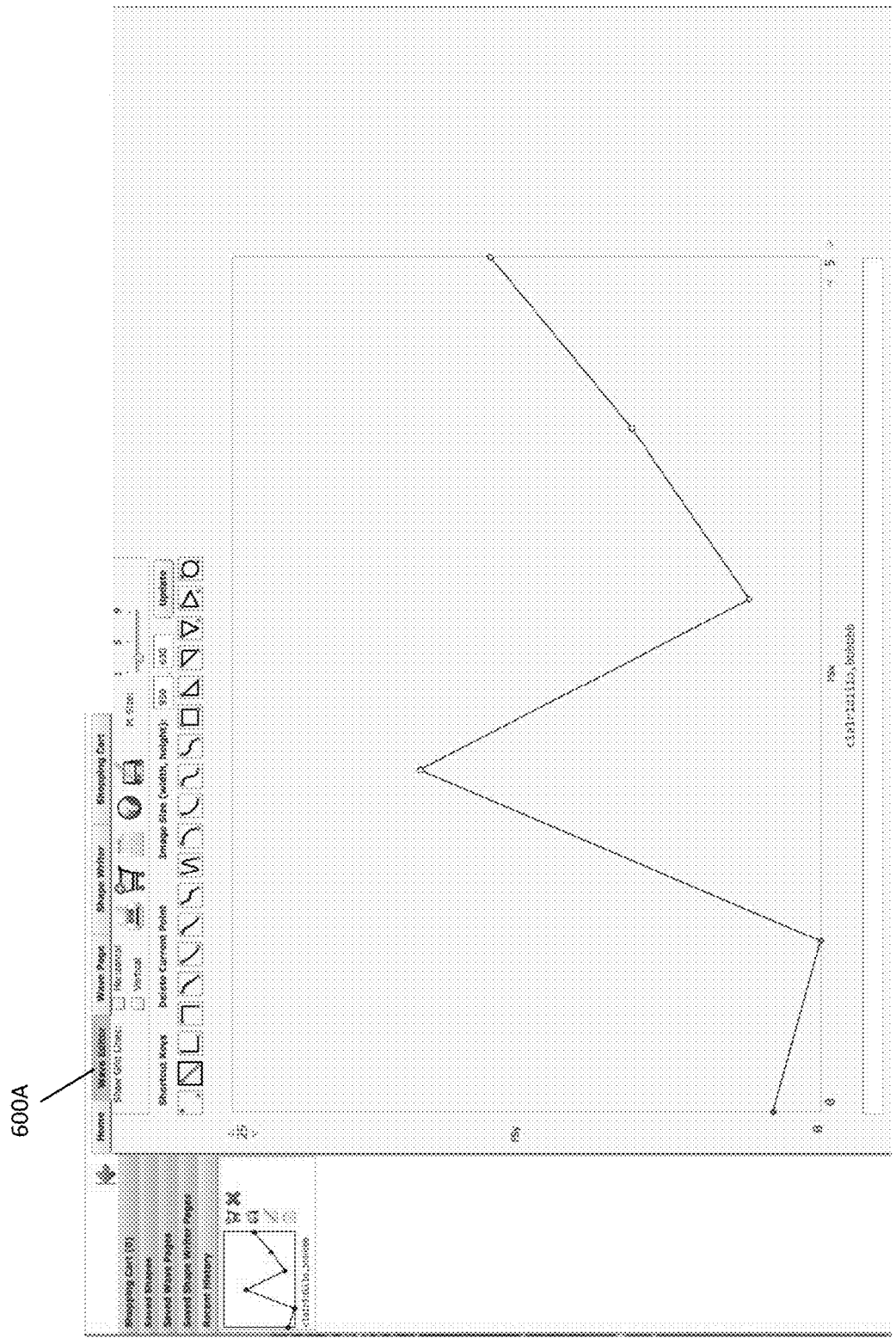
FIG. 6 is a screen shot of a wave editor page linked from the search module of FIG. 1.
Figure 7:
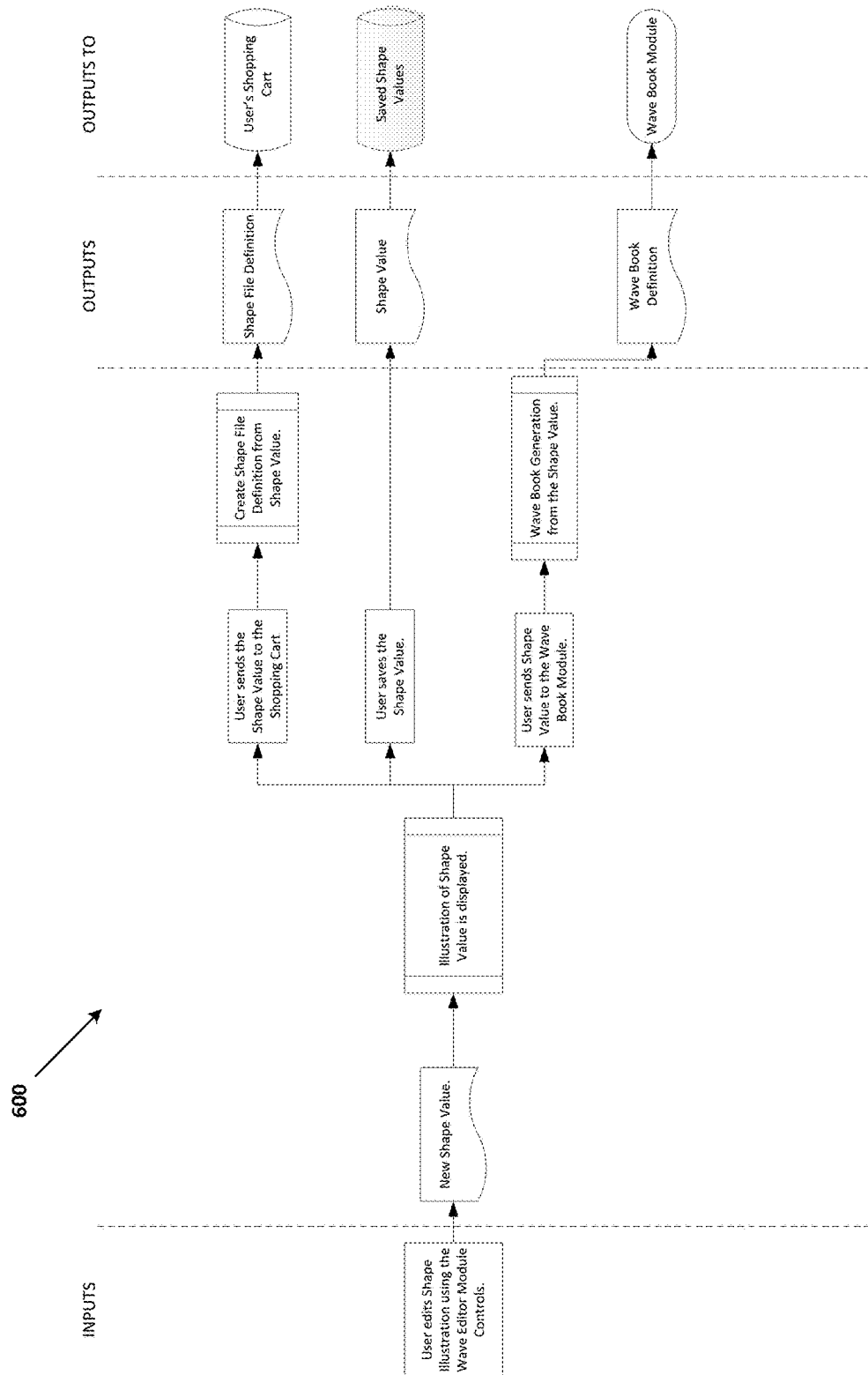
FIG. 7 is a functional block diagram of the wave editor module in FIG. 1.

If the customer chooses to edit the selected shape value and select the wave edit tab 600A, a representation of the selected shape value is displayed (FIG. 6). To edit the shape, the customer may display the x and y coordinates of a point by selecting the point, move a point manually by dragging the point to a new set of coordinates, delete a point, add a new point by selecting the location of the desired new point, and change the full x and y scales of the display. The customer may also change the interpolation method used to generate the path from one break point to the next. Available interpolation methods are displayed in boxes above the displayed shape with the method used to generate the path between a selected point and the next point being highlighted. To change the interpolation method from one break point to the next, the customer may select a different box. When the customer has completed the editing, the customer may save the shape value, print a plot of the shape value, send the shape value to the shopping cart for purchase, or go to the wave page to view a page or book of related shape value plots. FIG. 7 illustrates options that may be available to the user after the shape value has been processed by the wave editor module 600.

Figure 8A:
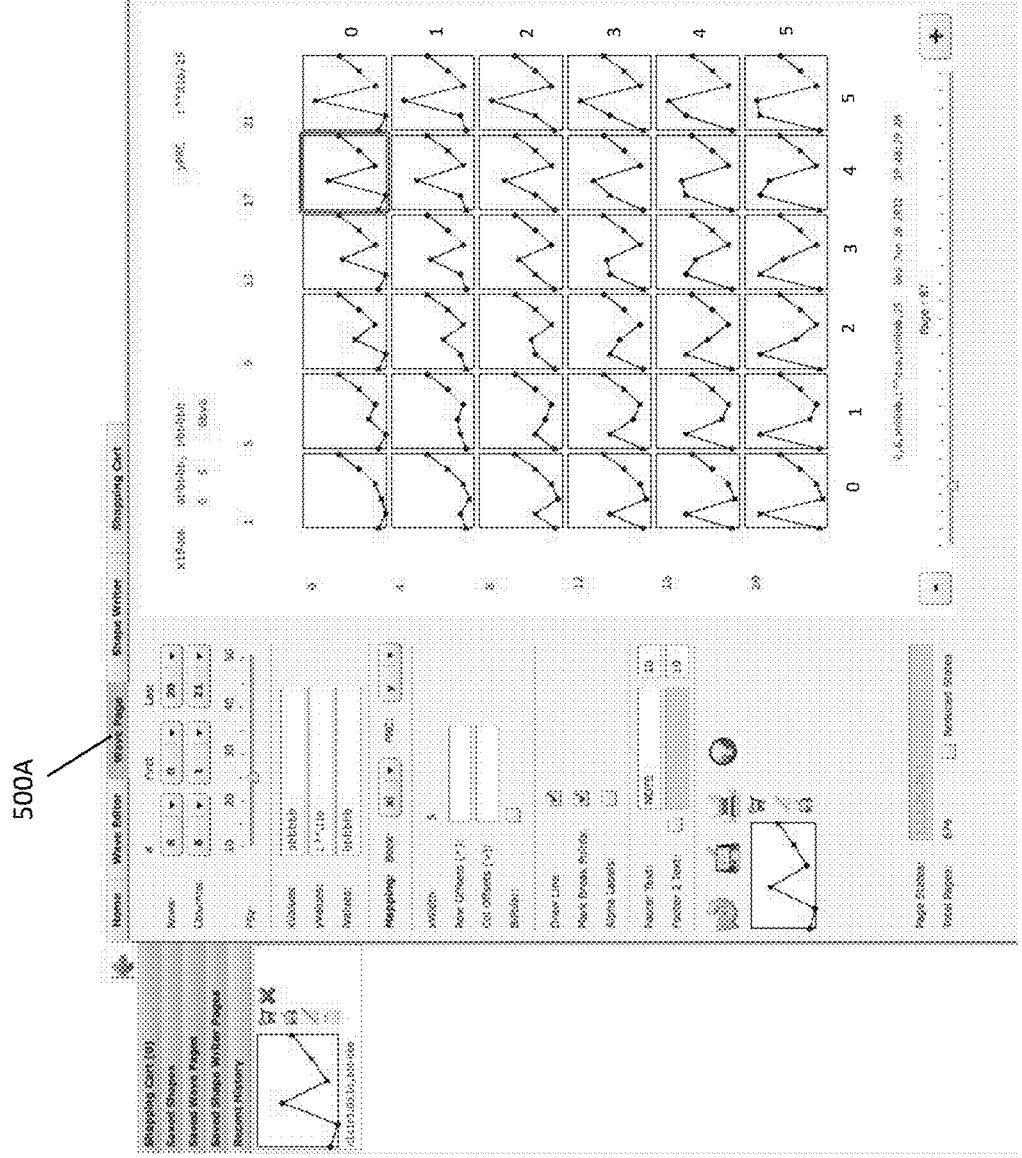
FIG. 8A is a screen shot of a wave page linked from the search module of FIG.
Figure 9:
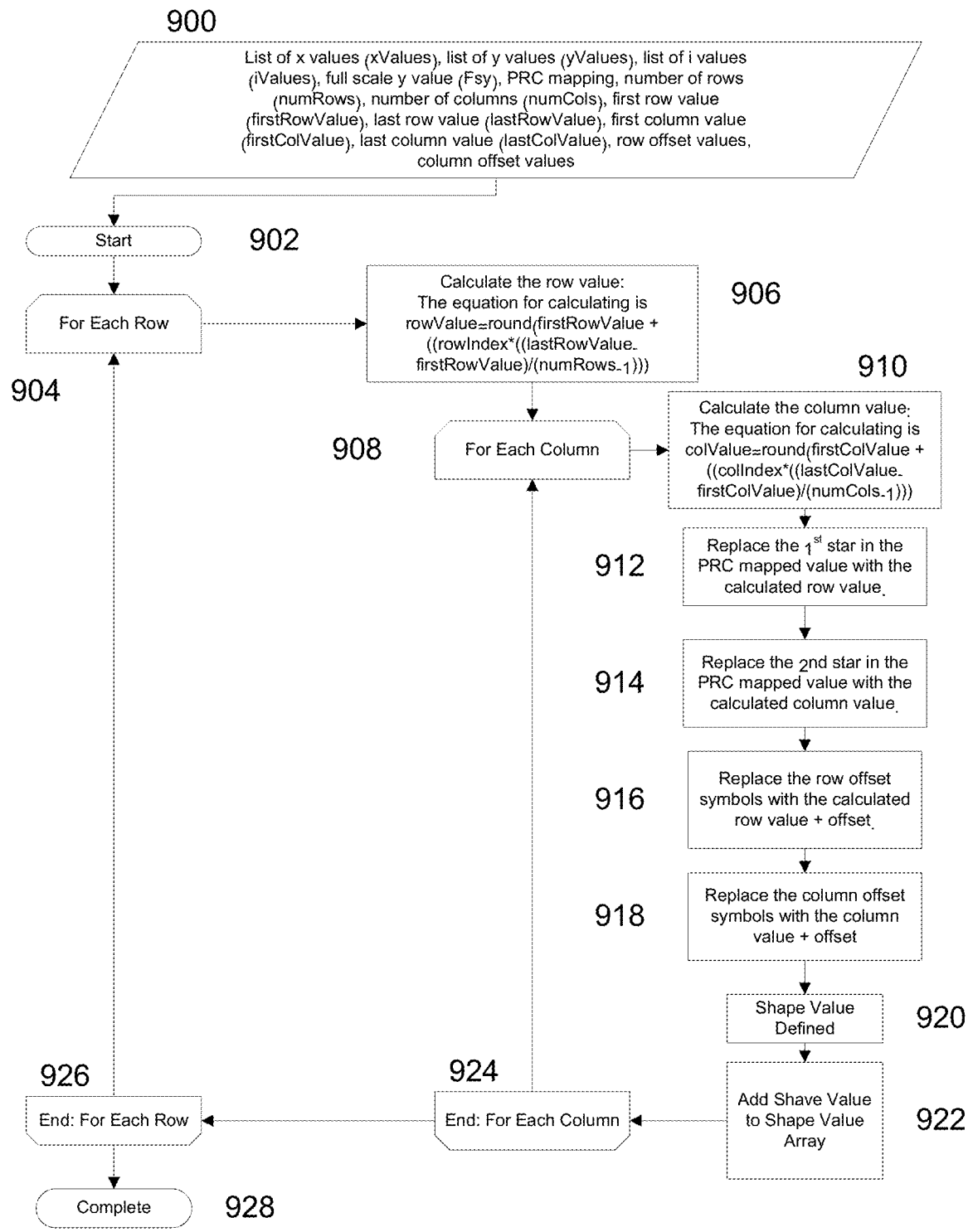
FIG. 9 is a flow chart of a method of generating a page of shapes.

When the customer goes to the wave page (FIG. 8A), an array of shape values is generated and plots are displayed with the previously selected shape highlighted. FIG. 9 is a flow chart of a method for generating a page of shapes. Based on the customer's input (such as from the search term or from manual entries) and the resulting wave shape generated from the wave generation module 400, the wave page generation module 500 receives a list of parameters. These may include xValues, a list of yValues, a list of iValues, the full scale yValue FSy, the PRC (page, row, column) mapping function, the number of rows (numRows) to be generated, the number of columns (numCols) to be generated, the values of the first and last rows (firstRowValue, lastRowValue), the values of the first and last columns (firstColValue, lastColValue), and the row and column offset values (step 900). When the user wishes to prevent a discontinuity when a shape is to be repeated, the user may set the first and last yValues to be equal. In such a case, the there will be a single state for the first and last yValues and it will remains constant across each page.

To begin (step 902), an outer loop is initiated. Each row index is converted to a rowValue. For example, in each row (step 904), the individual rowValue may be calculated as:

$$rowValue = firstRowValue + \frac{rowIndex * (lastRowValue - firstRowValue)}{numRows - 1}$$

(step 906).

Next, an inner loop is initiated. Each column index is converted to a column value. For example, in each column (step 908), the individual column value may be calculated as:

$$colValue = firstColValue + \frac{colIndex * (lastColValue - firstColValue)}{numCols - 1}$$

(step 910).

The first asterisk in the PRC mapping function is replaced with the calculated row value (step 912) and the second asterisk in the PRC mapped value is replaced with the calculated column value (step 914). If a row offset, represented by a caret ("^"), is present, it is replaced by the calculated row value plus the offset value (step 916). If a column offset, represented by a greater-than symbol (">"), is present, it is replaced by the calculated column value plus the offset value (step 918). It is understood that other suitable symbols could be used in place of the stars and carets.

When the shape value is complete (step 920), the shape value is added to the shape array (step 922). If there are shape values in further columns to be calculated (step 924), the process returns to the beginning of the column loop at step 908. When all of the columns are complete (step 924), a determination is made as to whether there are shapes in further rows to be calculated (step 926). If so, the process returns to the beginning of the row loop at (step 904); otherwise, the page is complete (step 928).

The displayed array (FIG. 8A) from the wave page module 500 represents one page (whose page number is indicated below the array) of a book of pages that may be assembled by the wave book module 900. The customer may select the number of rows and the number of columns of shape plots to be displayed as well as the values for the first and last rows and columns. For example, the array in FIG. 8A has six rows and six columns. Column values are labeled from left to right above the top row. Row values are labeled from top to bottom to the left of the first column. Indexes from which values are derived may be indicated horizontally below the bottom row and vertically to the right of the last column as shown in FIG. 8A. It is understood that, whether labeled or not, row indexes may run from zero at the top to the number of rows minus one at the bottom or they may run from bottom to top, but for the default method used here rows run from top to bottom. By default, columns are indexed from left to right unless otherwise specified.

Figure 8B:
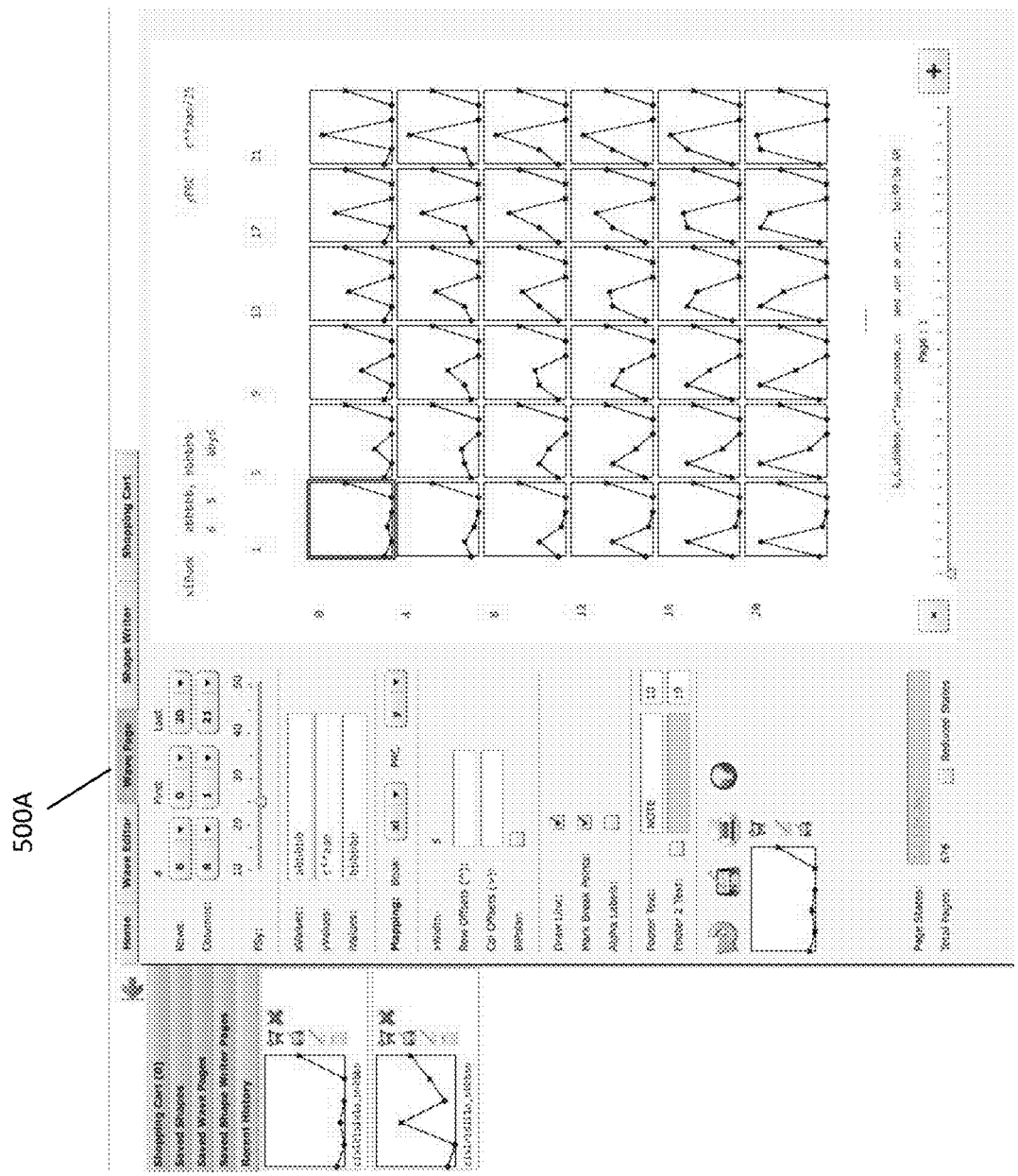
FIG. 8B is a screen shot of the first page of a book of which the wave pages of FIGS. 8A and 8C are a part.
Figure 8C:
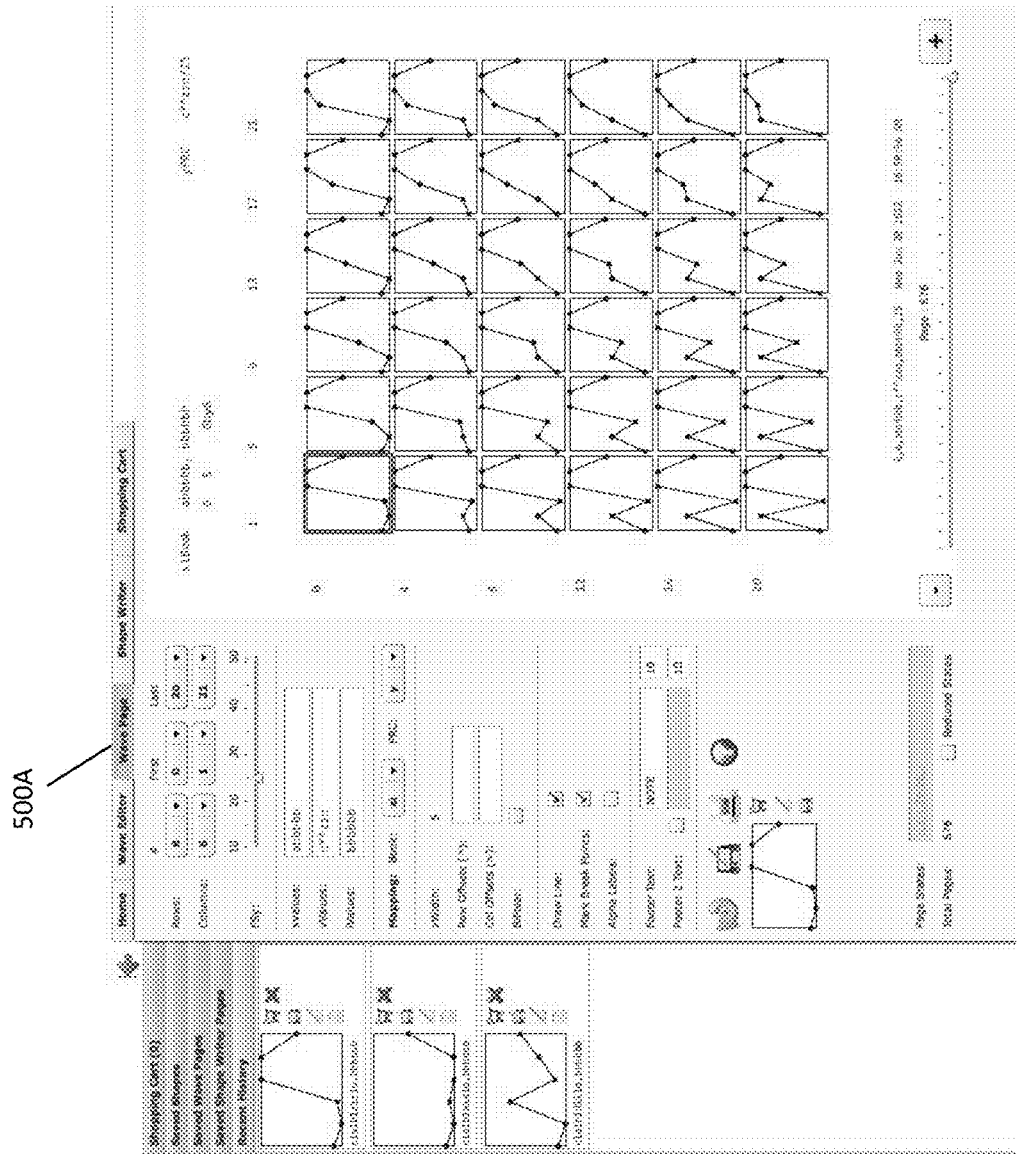
FIG. 8C is a screen shot of the last page of the book of which the wave pages of FIGS. 8A and 8B are a part.

Beneath the displayed array is a line that includes, among other information, the parameters of the page that is displayed: the number of rows and columns ("6" and "6" in FIG. 8A), the x, y, and i parameters of the wave shapes in alpha format ("abbbb", "cdio", "bbbbb", respectively), and the full scale value of y ("FSy=25"). The decimal page number is also displayed ("page 87" in FIG. 8A) and the customer may move to a different page by moving a slider or by clicking on '−' or '+' buttons. The first and last pages of the book are illustrated in FIGS. 8B and 8C, respectively, for comparison. The decimal page number is derived from a part of the mixed base number shown after yPRC. In FIG. 8A, the page value "di" equals the page index and represents "38 in base 26" but converts to decimal 86, then increased by one to 87 because it is preferred that the decimal pages begin at one, not zero. Similarly in FIG. 8B, the Page Index "aa represents zero in both base 26 and in decimal" but we add one. In FIG. 8C, the Page index "zz in Base 26" represents "decimal 676**" from 25×26+25+1.

By default, the "Reduced States" box below and to the left of the array is unchecked such that the page base will be 26, resulting in 626 pages. If, instead, the box is checked, the page base will be 6, resulting in 36 pages. However, it will be appreciated that the system may be designed to accommodate a page base of any value. While a large number of pages may be become unwieldy in physical form, that is not the case when a book of pages is provided in electronic form. When the page base is expressed as a mixed-base number, such as 123, the number of pages will be the multiple of the individual bases; e.g., 1*2*3=6. Moreover, the length of the page base may be extended without changing the multiple by including the base 1.

If desired, the customer may insert comments in a footer below the array.

The customer may also change the full scale y-value (FSy) by moving a slider and may change the x, y, or i values of a shape. In FIGS. 8A-8C, the xValues and iValues are controlled and held constant by the Book value as indicated by the mapping relation xi Book abbbbb, bbbbbb. The two positions of the yValue represented by asterisks are controlled by the Row and Column values and vary by row and column on a page. The other four positions are controlled by Page values and vary from page to page in the book. The first asterisk in the y value is replaced by the row value and the second asterisk is replaced by the column value. It will be appreciated that the asterisks may be placed in other positions to represent other mapping relations.

Although by default each break point in a plotted shape value is identified by a dot or other symbol and the points are connected by lines, the customer may choose to not display the connecting lines or to not display identification symbols for the break points. Further, the customer may choose to display the row and column labels as alpha characters instead of as decimal numbers.

A customer may want to generate an array in which all of the shapes have the same width. Therefore, the customer may enter the width 'S,' the code length 'L', and the minimum value 'minVal' or '$\alpha$' to generate a series of values having equal sums. The number 'N' of values with equal sums may be calculated as:

$$N = \frac{(S - \alpha L + L - 1)!}{[(S - \alpha L)! (L - 1)!]}$$

One may also generate the array itself and count the number N of entries. Referring to the flowchart of FIG. 13, to calculate each value 'C' in an array T, the user may first enter an initial code of length L, C=(1:L), and a minVal (step 1300). Initial conditions are set: n=L and k=1 (step 1302). If n is not greater than 1 (step 1304), then the procedure ends (step 1306). If n is greater than 1 (step 1304), a determination is made as to whether C(n) is greater than the minVal (step 1308). If not, then n is decremented by 1 (step 1310). This loop is repeated while n is greater than 1 and C(n) is not greater than minVal.

When C(n) is greater than the minVal (step 1308), C(n) is decremented by 1 and C(n-1) is incremented by 1 (step 1312). Next, an array entry C is calculated as C=C([1:n-1] [L:-1:n]) (step 1314). As a result, the code C remains the same from 1 to n-1 but the code from n to L is reversed as (L L-1, . . . , n). For example, if L=6, n=4 and C initially is (123456), then the new C is determined to be C=(123654). Subsequently, n is reset to L, k is incremented by 1, and the $k^{th}$ entry C is stored in the array T (step 1316). The procedure then returns to compare n to 1 (step 1304) and repeats as long as n remains greater than 1. When n is no longer greater than 1, the process ends (step 1306). If the first code C(1:L) is the numerically smallest code in the sequence, then at the end of the process (step 1306), k will equal the number N of values with equal sums.

For example, given S=5, L=3, minVal=1, there will be six values in the array T:

$$N = \frac{(S - \alpha L + L - 1)!}{[(S - \alpha L)! (L - 1)!]} = \frac{[(5 - 1*3 + 3 - 1)!]}{[(5 - 1*3)! * (3 - 1)!]} = \frac{4!}{2! 2!} = 6$$

Figure 13:
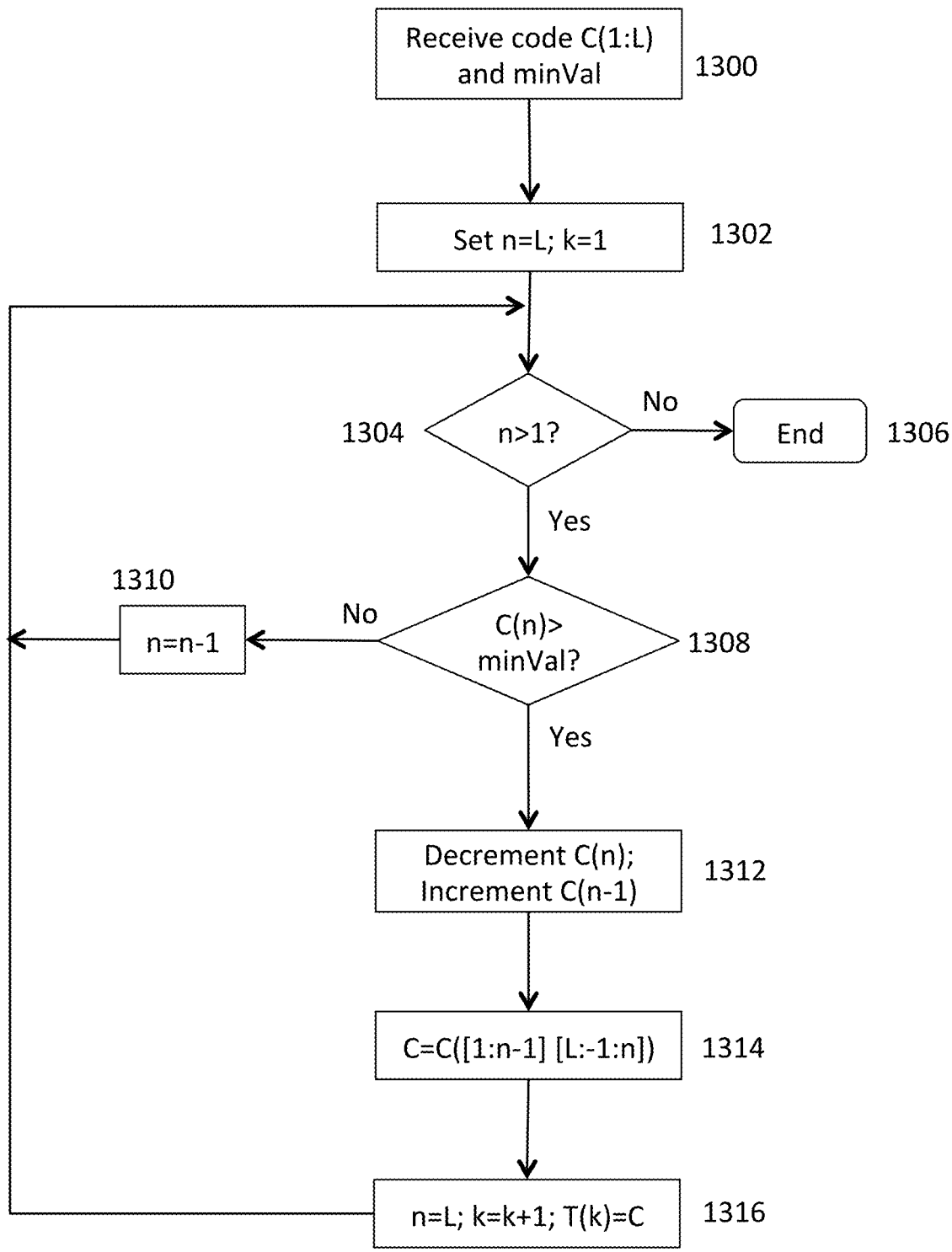
FIG. 13 is a flowchart of a method of generating an array of code values having equal sums.

Beginning with C(1:L)=[113] the values in the array T resulting from the application of the procedure of FIG. 13 are: 113, 122, 131, 212, 221, 311. A page of shape values based on the array T is shown in TABLE V, with each cell providing a new code of S=10 and L=6 where content of each cell begins with the row value and ends with the column value. The resulting entries may, for an example, map to xValues with yValues and iValues mapped to Page and Book. Or the row and column values also map conveniently to yValues with xValues and iValues mapped to Page and Book (such as xBook, iPage or iBook and xPage)

TABLE V

A 6 × 6 Page of Shape Values

| Values | 113 | 122 | 131 | 212 | 221 | 311 |
| --- | --- | --- | --- | --- | --- | --- |
| 113 | 113 113 | 113 122 | 113 131 | 113 212 | 113 221 | 113 311 |
| 122 | 122 113 | 122 122 | 122 131 | 122 212 | 122 221 | 122 311 |
| 131 | 131 113 | 131 122 | 131 131 | 131 212 | 131 221 | 131 311 |
| 212 | 212 113 | 212 122 | 212 131 | 212 212 | 212 221 | 212 311 |
| 221 | 221 113 | 221 122 | 221 131 | 221 212 | 221 221 | 221 311 |
| 311 | 311 113 | 311 122 | 311 131 | 311 212 | 311 221 | 311 311 |

As with the other pages, after the customer is finished working with the wave page, the page may be saved or printed through the publication module 1000, and a selected shape value may be saved, sent to the shopping cart, or sent to the wave editor. And, as with the other pages, the customer may use the tabs along the top of the page to move to the home page, the wave editor page, the shape writer page, or the shopping cart.

Figure 12:
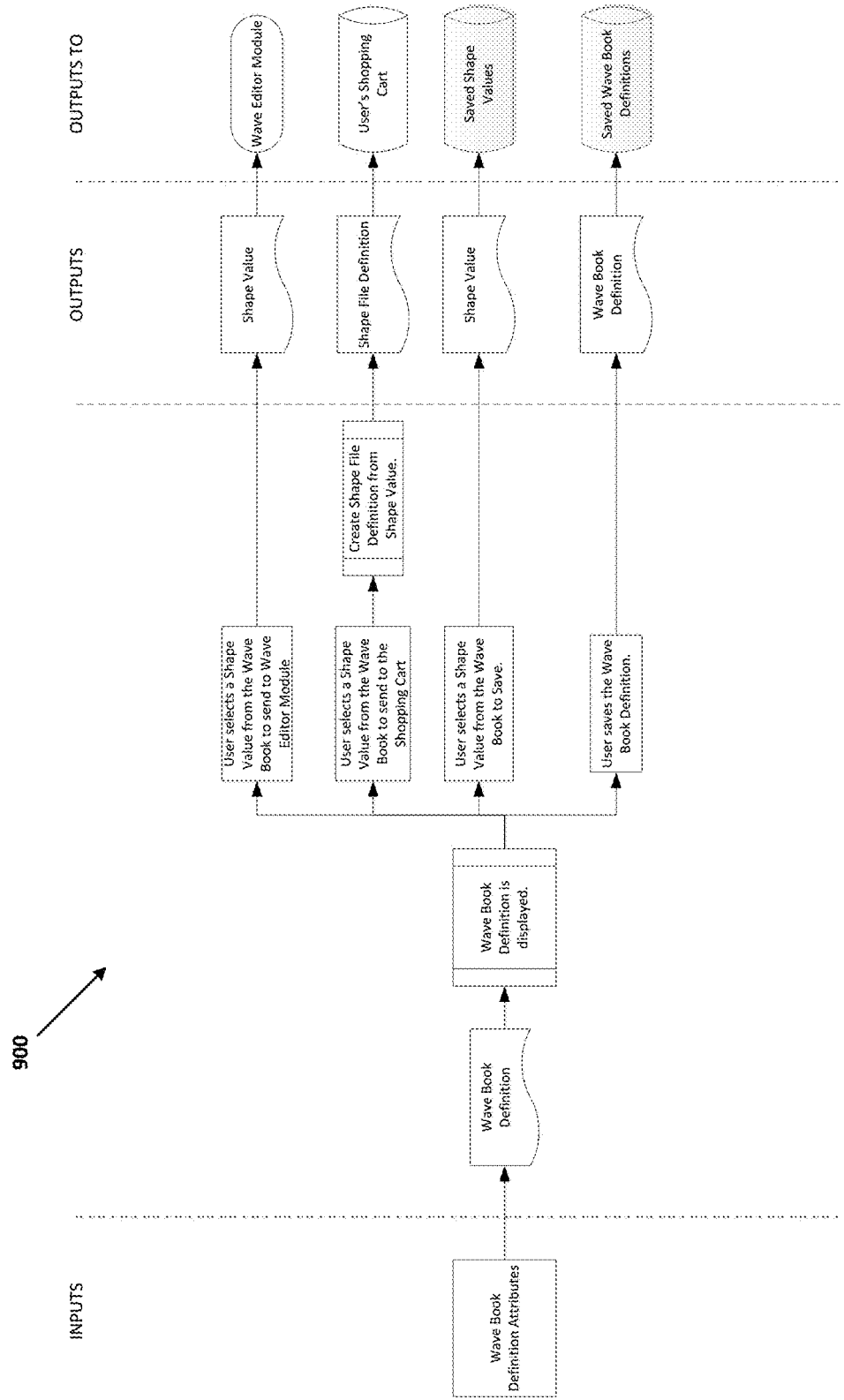
FIG. 12 is a functional block diagram of the wave book module in FIG. 1.

FIG. 12 is a functional block diagram of the wave book module 900. As noted above, a book of wave shapes may be displayed page by page using the wave page module 500. The user may select a shape value for editing with the wave editor module 600. The user may select a shape value from which to create a shape file definition. The shape file definition may then be processed by the data file generation module 800 to generate a data file to be placed in the user's shopping cart for subsequent purchase and export. The user may also select a shape value to be saved or choose to save the wave book definition.

Figure 10:
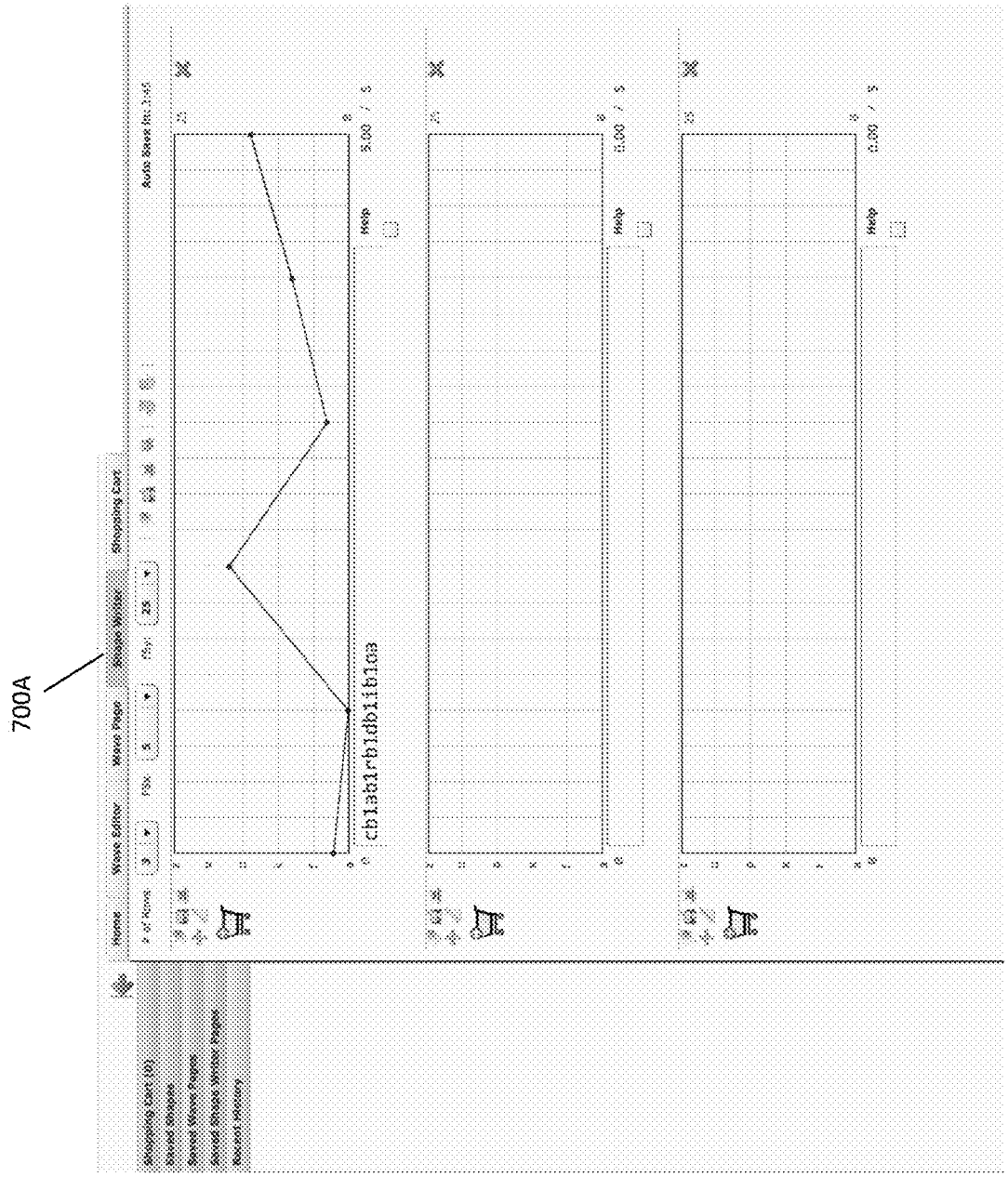
FIG. 10 is a screen shot of a shape writer page linked from the search module of FIG. 1.
Figure 11:
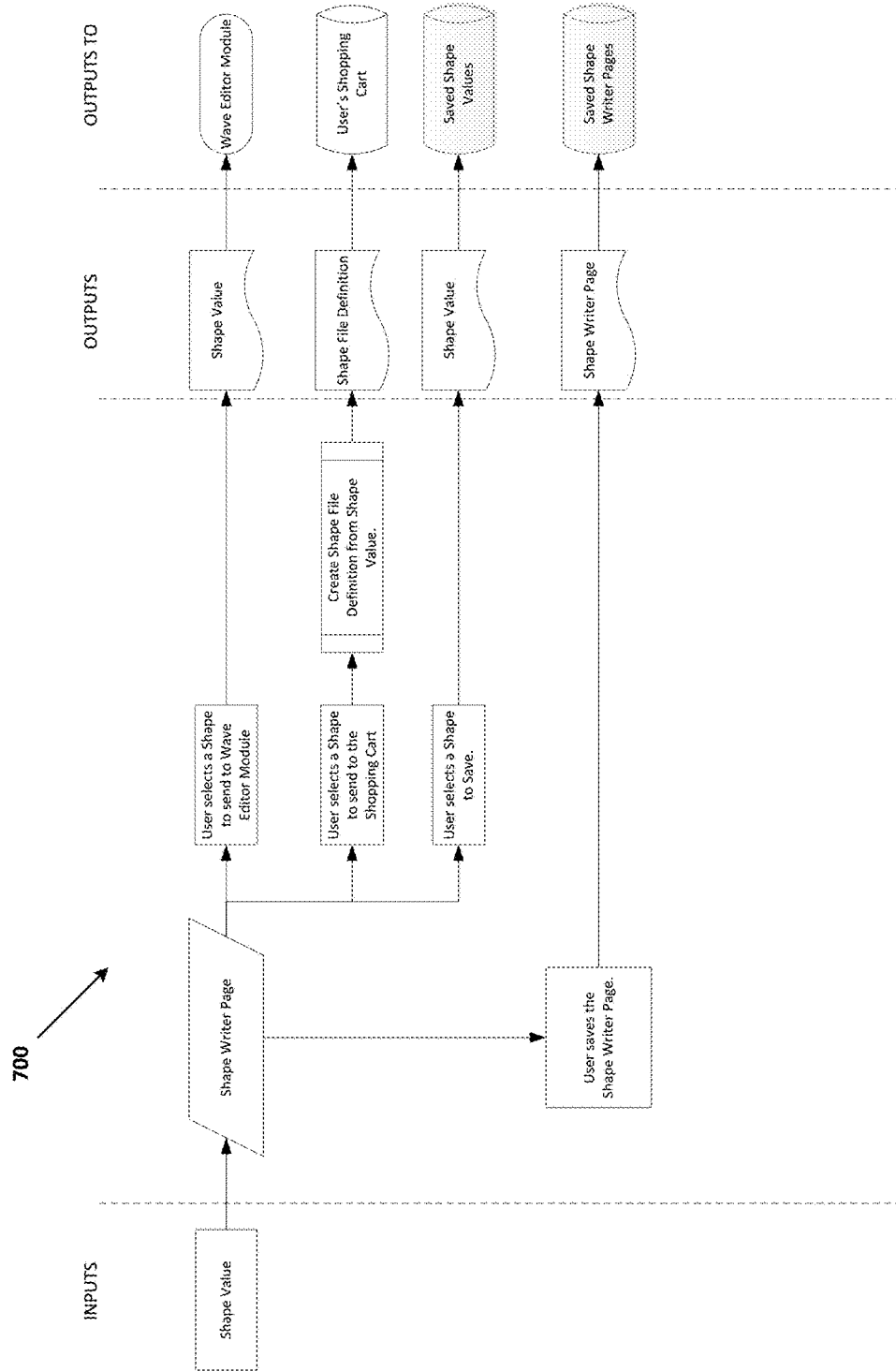
FIG. 11 is a functional block diagram of the shape writer module in FIG. 1.

When the shape writer module 700 is selected at the tab 700A, the customer may "write" one or more shapes directly on a blank graph form. Three such graphs are shown in FIG. 10. The customer may set the full scale x and y values, FSx and FSy, of the graphs. Each shape may then be "written: by "typing" in a selected format the x, y, and i values for each break point. As the customer writes the code values (types or otherwise selects characters) the break points and paths are illustrated on the graph simultaneously with the typed code values Each shape may be separately saved, printed, or sent to the wave editor. The shape may also be overlaid with a saved shape or a separately defined shape. FIG. 11 illustrates options that may be available to the user when using the shape writer module 700. When the customer has selected or defined a shape value definition and is ready to purchase a shape definition data file for the shape value, the customer may select the shopping cart tab 1100A from any of the displayed pages. The contents of the customer's shopping cart will be displayed and the customer may choose to purchase the selected wave products. After payment information has been entered, the data file generation module 800 may be initiated to convert the selected shape values into an exportable data file format. The resulting data file(s) may then be exported through the publication module 1000 to the customer using a removable storage device, such as a thumb drive or CD, or downloaded to the customer's computer, among other methods.

Figure 1B:
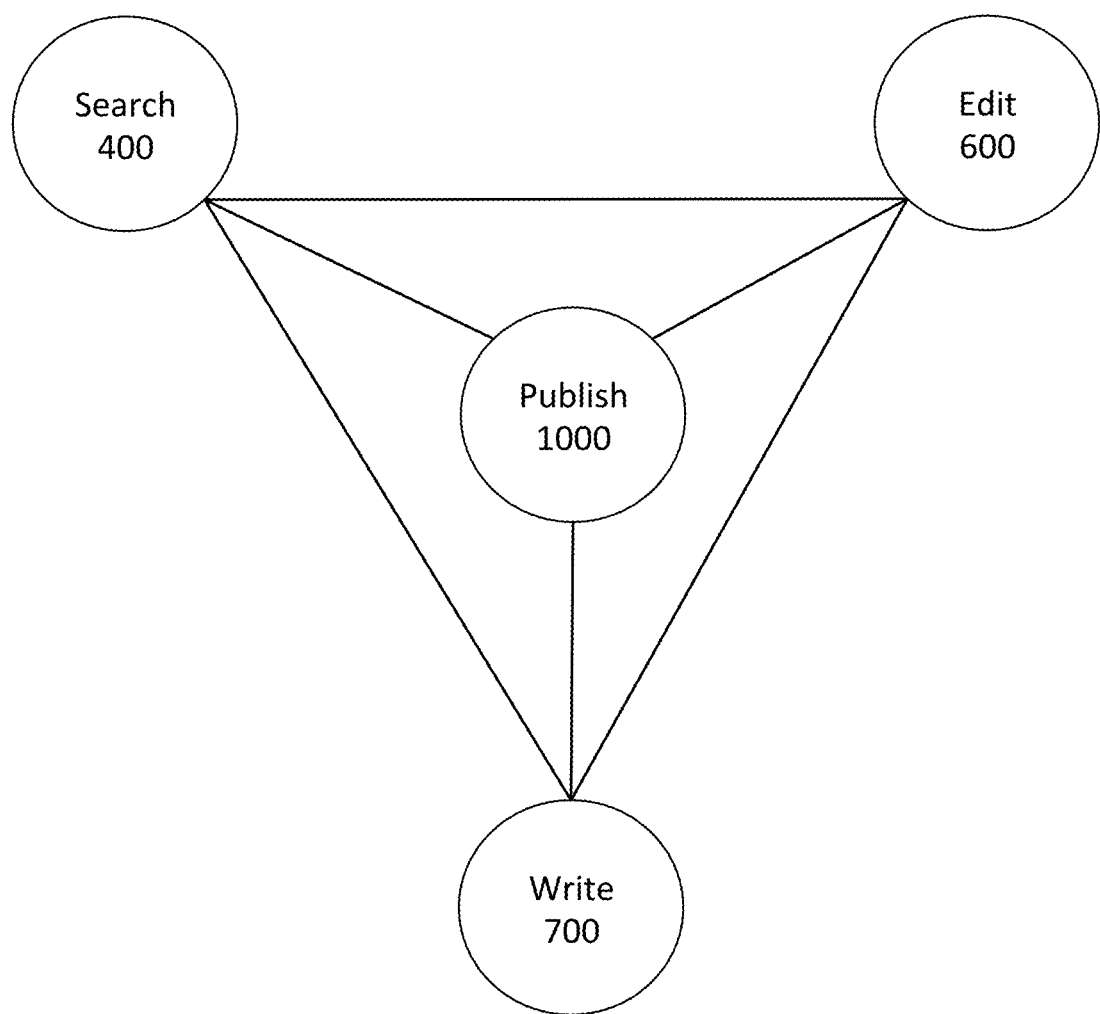
FIG. 1B illustrates the cooperative and independent interactive relations between Search, Write, Edit, and Publish modules.

Referring back to the interconnectivity illustrated in FIG. 1B, the following section summarizes the functionality, inputs, and outputs of each of the search, write, edit, and publication modules 400, 600, 700, 1000, respectively. It will be appreciated that the summary is not exhaustive and that other functionality, inputs, and outputs, may be implemented.

Search Module 400:

The search module 400 may generate shape values and wave page definitions from entered search terms. The outputs provided to, and inputs from, other modules include:

- Individual shape values generated from a search term may be sent to the write module 700;
- Individual shape values generated from a search term may be sent to the edit module 600;
- Individual shape values generated from a search term may be sent to the publish module 1000 to create a book of shape values with varying characteristics;
- The first indexed shape value generated from a search term may be automatically saved to a user's shape value history list;
- Individual shape values generated from a search term may be automatically saved to the user's saved shape list;
- Individual shape values generated from a search term may be automatically saved to the user's shopping cart 1100A;
- Shape values may be searched and retrieved from the user's list of saved shapes and displayed;
- Shape values may be added to the list of saved shapes from the write, edit, and publish modules 600, 700, 1000;
- Shape values may be searched and retrieved from the user's history list of saved shapes and displayed;
- Shape values may be added to the history list from the write, edit, and publish modules 600, 700, 1000;
- Shape values may be searched and retrieved from the user's shopping cart 1100A and displayed; and
- Shape values may be added to the shopping cart 1100A from the write, edit, and publish modules 600, 700, 1000.

Write Module 700:

The write module 700 may write shape values by inputting a valid shape value code, may create shape writer pages with multiple written shape values, and may compare shape values by providing functionality to overlay one or more shape values. The outputs provided to, and inputs from, other modules include:

- Individual shape values may be sent to the search module 400, resulting in a search-driven list of related shape values;
- Individual shape values may be sent to the edit module 600;
- Individual shape values may be sent to the publish module 1000, resulting in a book of shape values with varying characteristics;
- Individual shape values may be saved to the user's saved shape list;
- Individual shape values may be saved to the user's shopping cart 1100A;
- Shape values may be loaded into the write module 700 from the user's saved shape list;
- Shape values may be added to the user's saved shape list from the search, edit, and publish modules 400, 600, 1000;
- Shape values may be loaded into the write module 700 from the user's shape value history list;
- Shape values may be added to the user's shape value history list from the search, edit, and publish modules 400, 600, 1000;
- Shape values may be loaded into the write module 700 from the user's shopping cart 1100A; and
- Shape values may be added to the user's shopping cart 1100A from the search, edit, and publish modules 400, 600, 1000.

Edit Module 600

The edit module 600 may provide a canvas for moving, deleting, and adding individual break points to shape values and for modifying interpolation methods, shape widths, and full scale amplitudes. The outputs provided to, and inputs from, other modules include:

- Edited shape values may be sent to the search module 400, resulting in a search-driven list of related shape values;
- Edited shape values may be sent to the write module 700;
- Edited shape values may be sent to the publish module 1000, resulting in a book of shape values with varying characteristics;
- Each iteration of an edited shape value may be saved to the user's saved shape list;
- Edited shape values may be saved to the user's shopping cart 1100A;
- Shape values may be loaded into the edit module 600 from the user's saved shape list;
- Shape values may be added to the user's saved shape list from the search, write, and publish modules 400, 700, 1000;
- Shape values may be loaded into the edit module 600 from the user's shape value history list;
- Shape values may be added to the user's shape value history list from the search, write, and publish modules 400, 700, 1000;
- Shape values may be loaded into the edit module 600 from the user's shopping cart 1100A; and
- Shape values may be added to the user's shopping cart 1100A from the search, write, and publish modules 400, 700, 1000.

Publish Module

The publish module 1000 may define a book of shape values. The outputs provided to, and inputs from, other modules include:

- Shape values may be sent to the search module 400, resulting in a search-driven list of related shape values;
- Shape values may be sent to the write module 700;
- Shape values may be sent to the edit module 600;
- When sent to another module, the shape value may be saved to the user's shape history list;
- Shape values may be saved to the user's saved shape list;

Shape values may be loaded into the publish module 1000 from the user's saved shape list, resulting in a book of shape values with varying characteristics;

Shape values may be added to the user's saved shape list from the search, edit, and write modules 400, 600, 700;

Shape values may be loaded into the publish module 1000 from the user's shape value history list, resulting in a book of shape values with varying characteristics;

Shape values may be added to the user's shape value history list from the search, edit, and write modules 400, 600, 700;

Shape values may be loaded into the publish module 1000 from the user's shopping cart 1100A, resulting in a book of shape values with varying characteristics; and Shape values may be added to the user's shopping cart 1100A from the search, edit, and write modules 400, 600, 700.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for searching, writing, editing, and publishing waveform shape information, the system comprising:
    a display;
    a processor;
    a memory comprising instructions executable by the processor and comprising instructions for:
        receiving from customer a value L, representing a code length for all waveform shapes in a shape code value array T to be generated;
        receiving from the customer a value S, representing a width for all waveform shapes in the shape code value array T;
    generating the shape code value array T of distinct waveform shape code values in which each waveform shape code value has the same number of members, and the sum S of the member values is the same for each waveform shape code value;
    presenting the shape code value array T on the display to the customer;
    receiving from the customer a selection; and
    in response to the selection, at least one of:
        saving the shape code value array T;
        printing the shape code value array T;
        saving a selected waveform shape;
        adding a selected waveform shape to a shopping cart for purchase; and
        presenting options for editing a selected waveform shape.

2. The system of claim 1, wherein the instructions for generating the shape code value array T comprise instructions for:
    a) receiving an initial code C(1:L);
    b) receiving a minimum value minVal for each member of the code C;
    c) initializing a first counter 'n' to L;
    d) initializing a second counter 'k' to 1;
    e) determining if n is greater than 1:
        f) if n is not greater than 1, publishing the shape code value array T; and
        g) if n is greater than 1, determining if C(n) is greater than minVal:
            h) if C(n) is not greater than minVal, decrementing n by 1 and returning to step e); and
            i) if C(n) is greater than minVal:
                j) decrementing C(n) by 1;
                k) increment C(n-1) by 1;
                l) setting C equal to C([1:n-1] [L:−1:n]);
                m) entering C into T(k);
                n) incrementing k by 1;
                o) reinitializing n to L; and
                p) returning to step e).

3. The system of claim 1, wherein a maximum number N of waveform shape values in the shape code value array T is calculated from the relation:

$$N = \frac{(S - \alpha L + L - 1)!}{[(S - \alpha L)! (L - 1)!]}$$

where S equals the sum of the members in the waveform shape value, L equals the number of members in the waveform shape value, and a equals the minimum value for each member of the waveform shape value.

4. A method for searching, writing, editing, and publishing waveform shape information, the method comprising:
    receiving from a customer a value L, representing a code length for all waveform shapes in a shape code value array T to be generated;
    receiving from the customer a value S, representing a width for all waveform shapes in the shape code value array T;
    generating the shape code value array T of distinct waveform shape code values in which each waveform shape code value has the same number of members, and the sum S of the member values is the same for each waveform shape code value;
    presenting the shape code value array T on the display to the customer;
    receiving from the customer a selection; and
    in response to the selection, at least one of:
        saving the shape code value array T;
        printing the shape code value array T;
        saving a selected waveform shape;
        adding a selected waveform shape to a shopping cart for purchase; and
        presenting options for editing a selected waveform shape.

5. The method of claim 4, wherein the generating the shape code value array T comprises:
    a) receiving an initial code C(1:L);
    b) receiving a minimum value minVal for each member of the code C;
    c) initializing a first counter 'n' to L;
    d) initializing a second counter 'k' to 1;
    e) determining if n is greater than 1:
        f) if n is not greater than 1, publishing the shape code value array T; and
        g) if n is greater than 1, determining if C(n) is greater than minVal:

h) if C(n) is not greater than minVal, decrementing n by 1 and returning to step e); and i) if C(n) is greater than minVal:
j) decrementing C(n) by 1;
k) increment C(n-1) by 1;
l) setting C equal to C([1:n-1] [L:−1:n]);
m) entering C into T(k);
n) incrementing k by 1;
o) reinitializing n to L; and
p) returning to step e).

6. The method of claim 4, wherein a maximum number N of waveform shape values in the shape code value array T is calculated from the relation:

$$N = \frac{(S - \alpha L + L - 1)!}{[(S - \alpha L)! \, (L - 1)!]}$$

where S equals the sum of the members in the waveform shape value, L equals the number of members in the waveform shape value, and a equals the minimum value for each member of the waveform shape value.

\* \* \* \* \*